United States Patent
Nakamura et al.

(10) Patent No.: US 9,545,601 B2
(45) Date of Patent: *Jan. 17, 2017

(54) METHOD OF RECOVERING CARBON DIOXIDE AND RECOVERY APPARATUS

(71) Applicant: IHI Corporation, Koto-Ku (JP)

(72) Inventors: Shiko Nakamura, Tokyo (JP); Yasuro Yamanaka, Tokyo (JP); Kenji Takano, Tokyo (JP); Shinya Okuno, Tokyo (JP)

(73) Assignee: IHI Corporation, Koto-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/473,617

(22) Filed: Aug. 29, 2014

(65) Prior Publication Data

US 2014/0369913 A1    Dec. 18, 2014

Related U.S. Application Data

(63) Continuation of application No. PCT/JP2012/076496, filed on Oct. 12, 2012.

(30) Foreign Application Priority Data

Apr. 24, 2012  (JP) .................................. 2012-098640

(51) Int. Cl.
    *B01D 53/14*    (2006.01)
    *B01D 53/62*    (2006.01)
    (Continued)

(52) U.S. Cl.
    CPC ........... *B01D 53/62* (2013.01); *B01D 53/1406* (2013.01); *B01D 53/1425* (2013.01);
    (Continued)

(58) Field of Classification Search
    CPC .................. B01D 2258/0283; B01D 53/1406; B01D 53/1425; B01D 53/1475; B01D 53/62; B01D 53/96; C01B 31/20; Y02C 10/04; Y02C 10/06; Y02P 20/121; Y02P 20/152; Y02P 20/57
    See application file for complete search history.

(56) References Cited

U.S. PATENT DOCUMENTS

| | | | |
|---|---|---|---|
| 3,725,529 A | 4/1973 | Giammarco et al. | |
| 7,918,926 B2 * | 4/2011 | Iijima | B01D 53/1406 95/183 |

(Continued)

FOREIGN PATENT DOCUMENTS

| | | |
|---|---|---|
| EP | 1 736 231 A1 | 12/2006 |
| EP | 2 105 190 A1 | 9/2009 |

(Continued)

OTHER PUBLICATIONS

Partial Supplementary European Search Report issued Dec. 14, 2015 in Patent Application No. 12875484.3.

(Continued)

*Primary Examiner* — Duane Smith
*Assistant Examiner* — Cabrena Holecek
(74) *Attorney, Agent, or Firm* — Oblon, McClelland, Maier & Neustadt, L.L.P.

(57) ABSTRACT

The carbon dioxide recovery method and apparatus are capable of reducing energy for regenerating the absorbing liquid and operating cost. An absorption column has first and second absorbing sections that a gas is supplied through the first absorbing section to the second absorbing section and the absorbing liquid absorbs carbon dioxide. A regeneration column regenerating the absorbing liquid has first and second regenerating sections. The first regenerating section has an external heating implement and the second regenerating section is heated by the gas discharged from the first regeneration section. Circulation mechanism has a circulation system circulating the absorbing liquid between the second absorbing section and the first regenerating section, (Continued)

and a branch path branched from the circulation system. A part of the absorbing liquid circulating the circulation system flows from the second absorbing section through the first absorbing section and the second regenerating section successively to the first regenerating section.

9 Claims, 7 Drawing Sheets

(51) Int. Cl.
    *C01B 31/20*     (2006.01)
    *B01D 53/96*     (2006.01)

(52) U.S. Cl.
    CPC ......... *B01D 53/1475* (2013.01); *B01D 53/96* (2013.01); *C01B 31/20* (2013.01); *B01D 2258/0283* (2013.01); *Y02C 10/04* (2013.01); *Y02C 10/06* (2013.01); *Y02P 20/152* (2015.11); *Y02P 20/57* (2015.11)

(56) References Cited

U.S. PATENT DOCUMENTS

| | | | |
|---|---|---|---|
| 8,226,748 B2 | 7/2012 | Inoue et al. | |
| 2005/0132883 A1* | 6/2005 | Su | B01D 53/1425 95/235 |
| 2007/0283813 A1 | 12/2007 | Iijima et al. | |
| 2009/0101012 A1* | 4/2009 | Gal | B01D 53/1406 95/225 |
| 2011/0113965 A1 | 5/2011 | Iijima et al. | |
| 2011/0113966 A1* | 5/2011 | Iijima | B01D 53/1406 96/242 |
| 2011/0120315 A1 | 5/2011 | Iijima et al. | |
| 2011/0158891 A1 | 6/2011 | Nagayasu et al. | |
| 2013/0247755 A1* | 9/2013 | Horizoe | B01D 53/1462 95/8 |
| 2013/0305924 A1 | 11/2013 | Nakamura et al. | |
| 2013/0323147 A1 | 12/2013 | Iijima et al. | |
| 2014/0127102 A1 | 5/2014 | Okuno et al. | |
| 2014/0219898 A1 | 8/2014 | Nakamura et al. | |

FOREIGN PATENT DOCUMENTS

| | | | | |
|---|---|---|---|---|
| EP | 2 168 657 A1 | 3/2010 | | |
| FR | 2 305 220 | 10/1976 | | |
| FR | 2 954 178 A1 | 6/2011 | | |
| GB | 1 284 624 A | 8/1972 | | |
| GB | 1501195 A | 5/1975 | | |
| GB | 1 531 536 A | 11/1978 | | |
| JP | 49-40789 A | 11/1974 | | |
| JP | 51-23479 A | 2/1976 | | |
| JP | 56-22570 B1 | 5/1981 | | |
| JP | 56-84617 A | 7/1981 | | |
| JP | 2005-230808 A | 9/2005 | | |
| JP | 2005-254212 A | 9/2005 | | |
| JP | 2008-307520 A | 12/2008 | | |
| JP | 2009-214089 A | 9/2009 | | |
| JP | 2011-057485 A | 3/2011 | | |
| JP | 2011-213494 A | 10/2011 | | |
| JP | WO 2012070304 A1 * | 5/2012 | ......... | B01D 53/1462 |
| JP | 2012-110835 A | 6/2012 | | |
| JP | WO 2012102124 A1 * | 8/2012 | ......... | B01D 53/1425 |

OTHER PUBLICATIONS

Office Action issued Jun. 22, 2015 in Australian Patent Application No. 2012378451.
International Search Report mailed Jan. 29, 2013 for PCT/JP2012/076496 filed on Oct. 12, 2012 with English Translation.
International Written Opinion mailed Jan. 29, 2013 for PCT/JP2012/076496 filed on Oct. 12, 2012.
Jong I. Lee, et al., "Equilibrium Between Carbon Dioxide and Aqueous Monoethanolamine Solutions". J. appl. Chem. Biotechnol., 1976, 26, pp. 541-549.
U.S. Appl. No. 14/821,883, filed Aug. 10, 2015, Okuno, et al.
Extended European Search Report issued Jul. 7, 2016 in Patent Application No. 12875484.3
Office Action issued Oct. 6, 2016, in Canada Patent Application No. 2,866,235 (with English-language Translation) (25 pages).

\* cited by examiner

METHOD OF RECOVERING CARBON DIOXIDE AND RECOVERY APPARATUS

CROSS REFERENCE TO RELATED APPLICATIONS

This application is a continuation application of International Application No. PCT/JP2012/076496, filed on Oct. 12, 2012, which claims priority of Japanese Patent Application No. 2012-098640, filed on Apr. 24, 2012, the entire contents of which are incorporated by references herein.

BACKGROUND OF THE INVENTION

Field of the Invention

The present invention relates to a method of recovering carbon dioxide and recovery apparatus of carbon dioxide to return a clean gas into the air by separating and recovering carbon dioxide from a gas containing carbon dioxide such as a combustion gas.

Description of the Related Art

A large amount of fuel such as coal, heavy oil and extra heavy oil is used in facilities such as thermal power stations, ironworks and boilers. In regard to sulfur oxide, nitrogen oxide and carbon dioxide discharged by burning of the fuel, quantitative/concentration restriction on emissions has been required from the viewpoint of prevention of air pollution and global environmental protection. In recent years, carbon dioxide has been viewed as a problem as is a major contributor to global warming, and moves to suppress carbon dioxide emissions have been active worldwide. Therefore, various kinds of research have been vigorously conducted in order to enable recovery/storage of carbon dioxide from a combustion exhaust gas or a process exhaust gas instead of emitting carbon dioxide in the air. For example, a PSA (pressure swing adsorption) method, a membrane separation concentration method, and a chemical absorption technique using reaction absorption with a basic compound have been known as a method of recovering carbon dioxide.

In the chemical absorption technique, a basic compound that typically belongs to alkanolamines is mainly used as an absorbent, and the absorbing liquid is circulated in the treatment process thereof, generally, with use of an aqueous solution containing the absorbent as the absorbing liquid, by alternately repeating an absorption step of causing the absorbing liquid to absorb carbon dioxide contained in the gas and a regeneration step of regenerating the absorbing liquid by causing the absorbing liquid to release the absorbed carbon dioxide (see, for example, Publication Document 1 described below). Heating for the release of carbon dioxide is needed in the regeneration step, and it becomes important to reduce energy required for heating/cooling for the regeneration, in order to reduce the operation cost of carbon dioxide recovery.

As disclosed in Publication Document 1, a high-temperature absorbing liquid from which carbon dioxide has been discharged (lean solution) in the regenerating step is subjected to heat exchange with an absorbing liquid in which carbon dioxide has been absorbed (rich solution) in the absorbing step. In this way, thermal energy is possibly recovered to reuse in the regenerating step.

In order to reduce the energy required for recovering carbon dioxide from the absorbing liquid, according to Publication Document 2 listed below, the following is used for heating the absorbing liquid: residual heat of steam-condensed water generated from a regenerating heater for pulling out the absorbing liquid in the regenerating step and then subjecting the absorbing liquid to heat exchange with high-temperature steam. Furthermore, Publication Document 3 listed below states that, in order to promote the discharge of absorbed carbon dioxide, a stripping gas is introduced to be accompanied with carbon dioxide. Moreover, Publication Document 4 listed below states that two regeneration towers in each of which the absorbing liquid is heated to a high temperature or a low temperature are used and the absorbing liquid regenerated at the low temperature is supplied to a middle stage of an absorption column, thereby reducing energy required for heating.

DOCUMENTS LIST

Publication document 1: Japanese Patent Application Laid-Open (JP-A) No. 2009-214089
Publication Document 2: JP-A 2005-254212
Publication Document 3: JP-A 2005-230808
Publication Document 4: JP-A 2011-57485

BRIEF SUMMARY OF THE INVENTION

Energy required for the regenerating step is classified into sensible heat required for a rise in the temperature of an absorbing liquid, reaction heat generated when carbon dioxide is discharged from the absorbing liquid, and latent heat compensating for heat loss based on vaporization of water from the absorbing liquid. However, the above-mentioned precedent techniques are techniques related to the sensible heat or reaction heat, and energy concerned with the latent heat is discharged together with water vapor contained in the collected carbon dioxide. Consequently, there has still remained a room for improving the efficiency of the energy.

In order to spread the recovering of carbon dioxide for environment preservation, it is desired from an economical viewpoint to make the energy efficiency as high as possible to reduce costs for the recovery. It is important for energy saving to heighten the efficiency of recovering thermal energy from an absorbing liquid. This can also act effectively onto the efficiency of recovering carbon dioxide.

An object of the present invention is to solve the above-mentioned problems to provide a carbon dioxide recovery method and recovery apparatus capable of reducing energy required for regenerating the absorbing liquid to decrease operating costs.

Another object of the present invention is to provide a carbon dioxide recovery method and recovery apparatus capable of decreasing burdens onto the apparatus and the absorbing liquid and reducing energy required for regenerating the absorbing liquid without lowering the recovery ratio of carbon dioxide, thereby decreasing costs for collecting carbon dioxide.

Still another object of the invention is to provide a carbon dioxide recovery apparatus having a structure in which an already-existing carbon dioxide recovery apparatus is changed to make it possible to improve energy efficiency for regenerating the absorbing liquid.

In order to solve the problems, the inventors have repeated eager researches to find out that each of the absorbing step and the regenerating step is divided into at least two stages and the absorbing liquid is circulated by use of a circulation system in which a partial divergence and confluence are attained, thereby configuring a carbon dioxide recovery apparatus to carry out a carbon-dioxide-absorbing/recovering cycle. Thus, the present invention has been achieved.

According to an aspect of the present invention, a subject matter of a carbon dioxide recovery apparatus resides in comprising: an absorption column configured to bring a gas into contact with an absorbing liquid and to allow the absorbing liquid to absorb carbon dioxide contained in the gas, the absorption column having a first absorbing section and a second absorbing section which are arranged to supply the gas through the first absorbing section into the second absorbing section; a regeneration column that regenerate the absorbing liquid, configured to heat the absorbing liquid having carbon dioxide absorbed in the absorption column to cause the absorbing liquid to release the carbon dioxide, the regeneration column having a first regenerating section having an external heating implement and a second regenerating section arranged to be heated by heat from gas discharged from the first regenerating section; and a circulating mechanism comprising a circulation system configured to circulate the absorbing liquid between the second absorbing section and the first regenerating section, and a branch flow system branched from the circulation system to cause a part of the absorbing liquid circulated in the circulation system to flow from the second absorbing section through the first absorbing section and the second regenerating section successively, and be directed to the first regenerating section.

According to another aspect of the present invention, a subject matter of the carbon dioxide recovery method resides in comprising: an absorption treatment of bringing a gas into contact with an absorbing liquid to cause carbon dioxide contained in the gas to be absorbed into the absorbing liquid, the absorption treatment having a first absorbing step and a second absorbing step, and the gas being supplied through the first absorbing step to the second absorbing step; a regeneration treatment of heating the absorbing liquid in which carbon dioxide is absorbed in the absorption treatment to discharge carbon dioxide, thereby regenerating the absorbing liquid, the regeneration treatment having a first regenerating step and a second regenerating step, the absorbing liquid being heated in the first regenerating step with use of an external heating implement, and the absorbing liquid being heated in the second regenerating step with use of heat from the gas discharged in the first regenerating step; and a circulating step of circulating the absorbing liquid between the second absorbing step and the first regenerating step, and a branch flow step of causing a part of the absorbing liquid circulated in the circulating step to flow, as a branch flow, from the second absorbing step through the first absorbing step and the second regenerating step successively and be directed then to the first regenerating step.

According to the present invention, in the process of recovering carbon dioxide contained in the gas, an improvement is made in the efficiency of recovering heat used for regenerating the absorbing liquid, so that thermal energy required for the regeneration is possibly reduced without lowering the recovery ratio of carbon dioxide. The absorbing liquid may be a single liquid, and this is circulated, thereby making it easy to detect and adjust a fluctuation in the concentration of the absorbing liquid while the liquid is circulated. Thus, the invention can cope easily with a change in conditions to be set in accordance with a fluctuation in the content of the gas. The invention is good in energy efficiency and easily attains the setting/change of conditions for the treatment. Thus the absorbing liquid can be stably used, and it is useful for decreasing operating costs and facility-maintaining costs. Since the present invention can easily be performed using ordinary facilities without requiring special equipment or expensive apparatus. The invention can also be carried out in the state that a constituent element is added to already-existing facilities. Thus, the invention is economically favorable.

BRIEF DESCRIPTION OF THE DRAWINGS

The features and advantages of the carbon dioxide recovery method and recovery apparatus according to the present invention will more clearly understood from the following description of the conjunction with the accompanying drawings in which identical reference letters designate the same or similar elements or cases throughout the figures and in which.

DETAILED DESCRIPTION OF THE INVENTION

Figure 1:
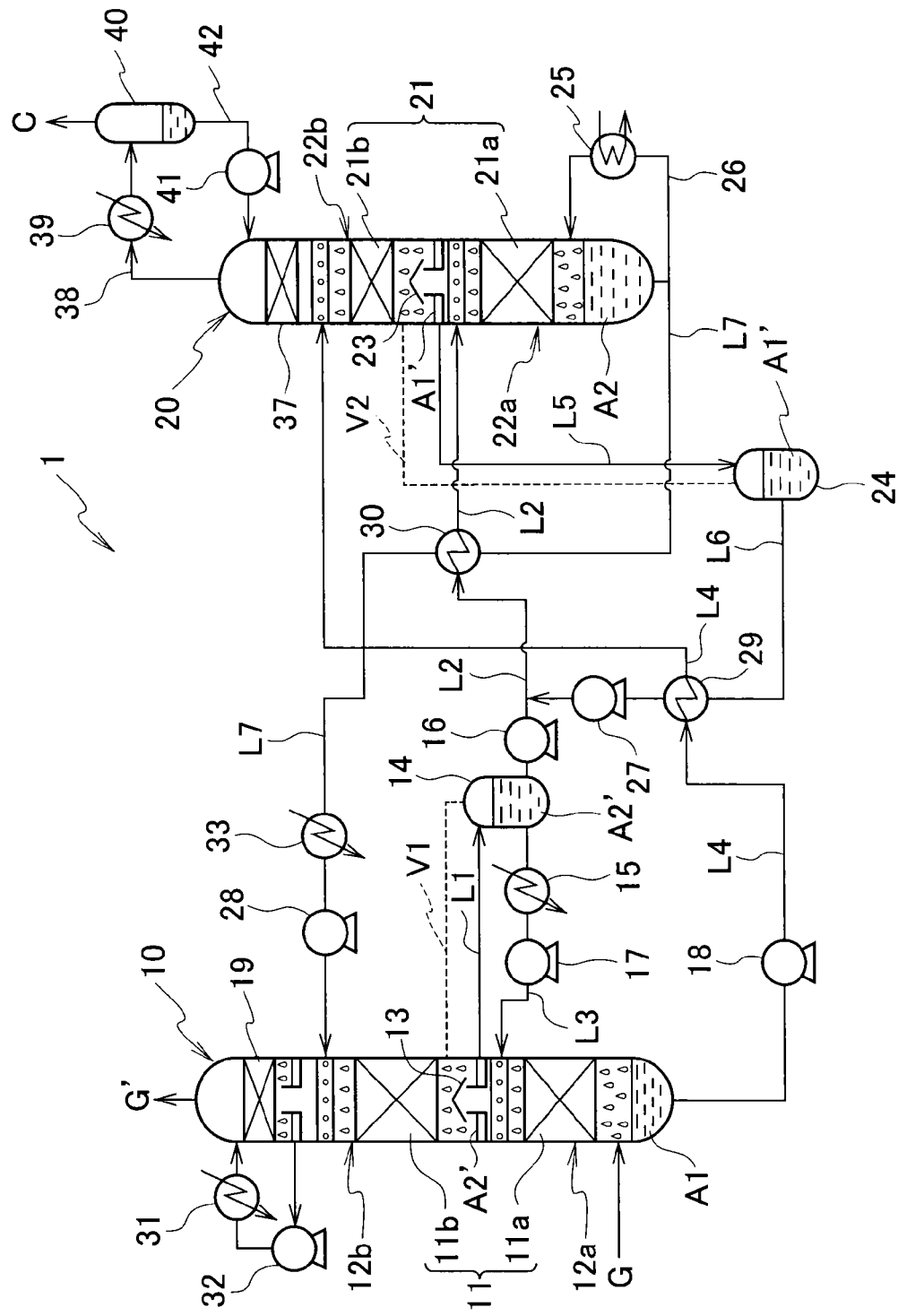
FIG. 1 is a schematic configuration diagram showing a first embodiment of the carbon dioxide recovery apparatus according to the present invention.

In an absorption process of carbon dioxide according to the chemical absorption method, an absorption treatment in which an absorbing liquid at low temperature is caused to absorb carbon dioxide contained in a gas and a regeneration treatment in which the absorbing liquid is regenerated by causing the absorbing liquid to release the absorbed carbon dioxide are alternately repeated by circulating the absorbing liquid between the absorption treatment and the regeneration treatment. The regeneration degree of the absorbing liquid in the regeneration treatment depends on the heating temperature of the absorbing liquid. As the temperature is higher, the absorbing liquid discharges a larger volume of carbon dioxide so that the remaining carbon dioxide concentration in the absorbing liquid becomes lower (see: Jong I. Lee, Federick D. Otto and Alan E. Mather, "Equilibrium Between Carbon Dioxide and Aqueous Monoethanolamine Solutions", J. appl. Chem. Biotechnol. 1976, 26, pp. 541-549). Thus, the absorbing liquid in the regeneration treatment is kept at a temperature near to the boiling point thereof by an external heating implement using thermal energy supplied from an external heat source. The absorbing liquid from which carbon dioxide has been discharged (lean solution) in the regeneration treatment, which is high in temperature, is subjected to heat exchange with the absorbing liquid in which carbon dioxide has been absorbed (rich solution) in the absorption treatment, and the heated rich solution is supplied to the regeneration treatment. Thus, thermal energy is recovered and reused. However, carbon-dioxide-containing gas discharged from the absorbing liquid in the regeneration treatment is discharged in a high-temperature state that the gas contains the heat. The heat quantity contained in the discharged gas is wasted. The temperature of the discharged gas, that is, the column-top temperature of the regeneration column can be made low by lowering the heat exchange ratio between the rich solution and the lean solution. However, it does not contribute to a reduction in the heat quantity because sensible heat recovered in the heat exchange is reduced.

In connection with this point, if each of the absorption treatment and the regeneration treatment is divided into at least two stages, so as to constitute two groups of an absorbing step and a regenerating step, and if the circulating path for circulating the absorbing liquid is also separated into two paths, such a structure makes it possible that heat quantity contained in the discharged gas is used to regenerate the absorbing liquid without lowering the heat exchange effectiveness. Specifically, a semi-rich solution that has undergone the absorption treatment at an upper region of the absorption column is positively heated by use of an external energy source at a lower region of the regeneration column, so as to regenerate the semi-rich solution sufficiently into a rich solution, and then the rich solution is caused to flow back to the upper region of the absorption column. The liquid caused to undergo an absorption treatment at a lower part of the absorption column, that is a rich solution resultantly absorbing sufficient carbon-dioxide, is heated at an upper region of the regeneration column, using heat emitted and recovered from the gas, so as to regenerate the rich solution to a semi-lean solution. The semi-lean solution is caused to flow back to the lower region of the absorption column. Heat exchange is then made between the respective absorbing liquids circulated in the groups. According to this structure, carbon dioxide is effectively collected to heightening the thermal-energy-using efficiency.

In the above-described structure, two circulating paths for the absorbing liquids are each independent of each other. However, condensed water of steam from the absorbing liquid in one of the paths shifted to the absorbing liquid in the other path to produce a nature that a difference in concentration is easily generated between the absorbing liquids in the two paths. Although this point can be corrected, using water collected from gases discharged from the individual columns, the inventors have found out another improvement capable of solving this point.

In the present invention, a circulating mechanism is adopted in which one of the above-mentioned circulating paths is configured as a branched path separated from the other circulating path and then joined with that path. In other words, the two circulating paths are partially joined with each other, and the concentration fluctuations of the absorbing liquid that may be generated at the branched portions can be canceled by jointing the branch flow with the main flow.

Hereinafter, referring to the drawings, a detailed description will be made about the carbon dioxide recovery method and carbon dioxide recovery apparatus of the present invention.

FIG. 1 illustrates an embodiment of the carbon dioxide recovery apparatus of the invention. A recovery apparatus 1 has an absorption column 10 configured to bring a gas G containing carbon dioxide into contact with an absorbing liquid to cause carbon dioxide to be absorbed into the absorbing liquid, and a regeneration column 20 which is configured to heat the absorbing liquid in which carbon dioxide is absorbed, to discharge carbon dioxide from the absorbing liquid and regenerate the absorbing liquid. The gas G supplied to the recovery apparatus 1 is not particularly limited and thus, various carbon-dioxide-containing gases, such as combustion exhaust gas and a process exhaust gas, can be handled. The absorption column 10 and the regeneration column 20 are each configured as a gas-liquid contact equipment of a countercurrent type, and are filled with fillers 11 and 21, respectively, for increasing their contact areas. The absorbing liquid used therein is an aqueous liquid containing, as an absorbent, an alkanolamine or any other compound having affinity with carbon dioxide. The fillers 11 and 21 are made of a material having endurance and corrosion resistance at the treatment temperatures and may be appropriately selected to be used, respectively, from fillers having a shape capable of providing a desired contact area. In general, fillers made of an iron-based metal material, such as stainless steel or carbon steel, may be used for these fillers, but the fillers are not limited thereto. If necessary, a cooling column may be provided for keeping the gas G to be supplied into the absorption column 10 at a low temperature suitable for the absorption of carbon dioxide.

The gas G containing carbon dioxide is supplied through a lower portion of the absorption column 10. The inside of the absorption column 10 is partitioned into a first absorbing section 12a at the lower side in which a filler 11a is held, and a second absorbing section 12b at the upper side in which a filler 11b is held. Between the first and second absorbing sections 12a and 12b, a partitioning member 13 is interposed such that a cylindrical wall stands on the circumferential edge of a central hole formed in a horizontal circular plate, and a lamp-shade-like member covers over the upper end hole of the cylindrical wall of the partitioning member 13, and it is configured so that a liquid reservoir is formed on the horizontal circular plate between the inner wall of the absorption column 10 and the cylindrical wall of the partitioning member 13. The gas G supplied through the lower portion of the absorption column 10 rises in the column to pass through the filler 11a in the first absorbing section 12a, and then passes through the inner bore of the cylindrical wall of the partitioning member 13 to pass through the filler 11b in the second absorbing section 12b.

On the other hand, when the absorbing liquid is supplied through an upper region of the second absorbing section 12b of the absorbing column 10, the absorbing liquid flows down through filler 11b, and then stored on the liquid reservoir of the partitioning member 13. The absorbing liquid is discharged through a path L1 to the outside of the column, without flowing down to the first absorbing section, to be stored in a tank 14. The path for the absorbing liquid is branched at the tank 14, so that on one hand a path L2 attains connection between the tank 14 and a center of the regeneration column 20, and on the other hand a path L3 attains connection between the tank 14 and a center of the absorption column 10. Thus, the absorbing liquid in the tank 14 is divided into two flow parts. One of the flow parts is supplied through the path L2 to the regeneration column 20 by a pump 16 while the other absorbing liquid part is supplied through the path L3 to an upper region of the first absorbing section 12a of the absorption column 10 and then flows down through filler 11a to be then stored on the bottom portion of the absorption column 10. To the top of the tank 14, a ventilating pipe V1 is connected to communicate with the second absorbing section in order to cancel a fluctuation in the pressure in the tank 14. The path L3 is provided with a cooler 15 for cooling the absorbing liquid, and a pump 17.

While the gas G passes through the fillers 11a and 11b, the gas is brought into gas-liquid contact with the absorbing liquid successively, so that carbon dioxide in the gas G is absorbed into the absorbing liquid. Since the gas after passing through the first absorbing section has been lowered in carbon dioxide concentration, the absorbing liquid supplied to the second absorbing section 12b contacts a gas lower in carbon dioxide concentration than the gas G. Absorbing liquid A2' which has absorbed carbon dioxide in the second absorbing section 12b and which has been stored in the liquid reservoir of the partitioning member 13 is a semi-rich solution. A part thereof is supplied from the tank 14 through the path L2 to the regeneration column 20. The remainder thereof flows, as a branch flow, from the tank 14, and then passes through the cooler 15 to be supplied to the first absorbing section 12a. This flow absorbs carbon dioxide to be a rich solution, and then stored on the bottom portion of the absorption column 10. By a pump 18, the absorbing liquid A1 (rich solution) on the bottom portion of the absorption column 10 is supplied, through a path L4 attaining connection between the bottom portion of the absorption column 10 and the upper region of the regeneration column 20, to the regeneration column 20. Gas G' from which carbon dioxide has been removed is discharged through the top of the absorption column 10.

When the absorbing liquid absorbs carbon dioxide, heat is generated so that the temperature of the liquid is raised. Thus, as the need arises, a cooling condenser section 19 is provided at the top of the absorption column 10 to condense water vapor and others contained in the gas G'. This section enables to restrain the water vapor and the others to some degree from leaking outside the column. In order to further ensure the restraint, the recovery apparatus has a cooler 31 and a pump 32 located outside the absorption column. A part of condensed water stored under the cooling condenser section 19 (the condensed water part being permissible to contain the gas G' in the column) is circulated between the cooling condenser section 19 and the cooler 31 by means of the pump 32. The condensed water and others that have been cooled by the cooler 31 to be supplied to the column top portion cause the cooling condenser section 19 to be kept at a low temperature, and causes the gas G' passing through the cooling condenser section 19 to be certainly cooled. The driving of the pump 32 is controlled in such a manner that the temperature of the gas G' discharged outside the column is preferably about 60° C. or lower, more preferably 45° C. or lower. In the structure in FIG. 1, water condensed in the cooling condenser section 19 is supplied to the filler 11b. Since the condensed water is usable to correct a fluctuation in the composition of the absorbing liquid in the columns, it is thus allowable, as the need arises, that the concentration composition of the absorbing liquid is detected and the condensed water is supplied to the filler 11a and/or filler 11b in accordance with the ratio of the fluctuations in the concentration.

The inside of the regeneration column 20 is partitioned into a first regenerating section 22a at the lower side in which a filler 21a is held, and a second regenerating section 22b at the upper side in which a filler 21b is held. Between the first and second regenerating sections 22a and 22b, a partitioning member 23 is interposed which has the same structure as the partitioning member 13 to form a liquid reservoir. The absorbing liquid A1 supplied from the bottom portion of the absorption column 10 through the path L4 is introduced to the upper portion of the second regenerating section 22b of the regeneration column 20 to flow down through the filler 21b, and then stored in the liquid reservoir of the partitioning member 23. It is configured that the absorbing liquid A1' is discharged to the outside of the column through the path L5 without flowing down to the first regenerating section, and is then stored in the tank 24. The absorbing liquid A2' supplied from the second absorbing section 12b of the absorption column 10 through the paths L1, L2 is supplied to the upper portion of the first regenerating section 22a to flow down through the filler 21a, and then stored on the bottom portion of the regeneration column 20.

A reboiler is fitted, as an external heating implement for heating the absorbing liquid positively by use of energy supplied from the outside, to the bottom portion of the regeneration column 20. Specifically, a steam heater 25 located outside the regeneration column 20, and a circulating path 26 for circulating, through the steam heater 25, the absorbing liquid A2 stored on the column bottom portion are equipped. The absorbing liquid A2 on the column bottom portion is partially branched through the circulating path 26 and supplied into the steam heater 25, and it is continuously heated by heat exchange with high-temperature steam to flow back into the column. In this manner, the absorbing liquid A2 on the bottom portion is positively heated by the external heating implement to discharge carbon dioxide sufficiently, and the filler 21a is also heated indirectly to promote the discharge of carbon dioxide by gas-liquid contact on the filler 21a. A high-temperature gas containing carbon dioxide and water vapor discharged from the absorbing liquid rises to pass through the filler 21a in the first regenerating section 22a. Thereafter, it passes through the inner hole surrounded by the cylindrical wall of the partitioning member 23 to pass through the filler 21b in the second regenerating section 22b. During this period, the absorbing liquid A2' flowing down through the filler 21a and the absorbing liquid A1 flowing down through the filler 21b are heated so that carbon dioxide in the absorbing liquids A1 and A2' is discharged. The absorbing liquid A1 supplied into the second regenerating section 22b does not receive any positive heating by the external heating implement, so as to be heated only by heat of gas discharged from the first regenerating section 22a. Thus the temperature of the absorbing liquid A1' in the reservoir of the partitioning member 23 is lower than that of the absorbing liquid A2. Consequently, the regeneration degree of the absorbing liquid A1' becomes lower than that of the absorbing liquid A2 on the column bottom portion, so as to become a semi-lean solution. The absorbing liquid A1' form which carbon dioxide has been emitted in the second regenerating section 22b flows down from the liquid reservoir of the partitioning member 23 through the path L5 into the tank 24. A bottom region of the tank 24 is connected through a path L6 to the path L2 so that absorbing liquid A1' inside the tank 24 is supplied into the path L2 by a pump 27 provided on the path L6, thereby being joined with absorbing liquid A2' supplied from the tank 14. To the top of the tank 24, a ventilating pipe V2 is connected to communicate with the second regenerating section 22b, in order to cancel a fluctuation in the pressure in the tank 24.

The absorbing liquid A2 (lean solution) stored on the bottom portion of the regeneration column 20, from which carbon dioxide has been sufficiently emitted, is caused to flow back by a pump 28, through a path L7 attaining connection between an upper region of the absorption column 10 and a bottom portion of the regeneration column 20, to the upper region of the second absorbing section 12b of the absorption column 10. As a result, a circulation system is formed in which the absorbing liquid A2 or A2' goes and comes back between the second absorbing section 12b and the first regenerating section 22a through the paths L1, L2 and L7. Moreover, a branch flow system is formed in which a part of the absorbing liquid in the circulation system flows, as a branch flow, through the paths L3 to L6 and is passed as the branched absorbing liquid A1 or A1' through the first absorbing section 12a and the second regenerating section 22b to be joined with the absorbing liquid in the circulating system. In other words, the paths L1, L2 and L7 constitute a circulating path between the second absorbing section and the first regenerating section; and the paths L3 to L6 are branched from the second absorbing section 12b in this circulating path so as to be again connected, via the first absorbing section 12a and the second regenerating section 22b, to the circulating path before a position where the circulating path reaches the first regenerating section 22a, so that the paths L3 to L6 form a branch flow system. The carbon-dioxide-containing gas emitted from the absorbing liquid in the regeneration column 20 is discharged through the top of the regeneration column 20.

The absorbing liquid A1', from which carbon dioxide has been discharged in the second regenerating section 22b, passes through a first heat exchanger 29 while flowing in the paths L5 and L6, so that heat exchange is performed between the path L4 and the path L6 in the first heat exchanger 29. Consequently, the absorbing liquid A1' is cooled with the absorbing liquid A1 in the path L4, and it is joined with the absorbing liquid A2' in the path L2. Moreover, the absorbing liquid A2, from which carbon dioxide has been discharged in the first regenerating section 22a, passes through a second heat exchanger 30 while flowing in the path L7, so that heat exchange is performed between the path L7 and the path L2 in the second heat exchanger 30. Consequently, the absorbing liquid A2 is cooled with the absorbing liquid (A1'+A2') in the path L2, and further sufficiently cooled by a cooler 33 using cooling water. Thereafter, the absorbing liquid A2 is introduced into the upper portion of the second absorbing section 12b. Heat exchangers can be classified into various types such as spiral, plate, double-tube, multi-cylinder, circular multi-tube, eddy tube, eddy plate, tank coil, tank jacket, and direct contacting liquid types. Each of the exchangers used in the present invention may be any one of these types. From the viewpoint of the simplification of the exchangers and easiness of the disassembly and cleaning thereof, plate type exchangers are excellent.

A carbon-dioxide-containing gas discharged from the absorbing liquid by heating in the regeneration column 20 passes through a cooling condenser section 37 at an upper portion of the regeneration column 20, and then discharged through an exhaust pipe 38 from the top thereof. The gas is sufficiently cooled by a cooler 39 using cooling water, so that water vapor and others contained therein are condensed as much as possible. The resultant condensed water is removed by a gas-liquid separator 40, and then recovered as a recovery gas C. The cooling condenser section 37 condenses water vapor contained in the gas to restrain the discharge thereof, and further restrains the discharge of the absorbent. By injecting carbon dioxide contained in the recovery gas C into, for example, the earth or an oil well, carbon dioxide gas is possibly fixed in the earth and re-organized. The condensed water separated in the gas-liquid separator 40 is supplied at a predetermined flow rate through a flow path 42 into an upper portion of the cooling condenser section 37 of the regeneration column 20 by a pump 41 so that the water functions as cooling water.

In the regeneration column 20, an expression of $T1>T2$ is satisfied in which T represents the temperature of the absorbing liquid A2 heated on the bottom of the first regenerating section 22a, and T2 represents the temperature of the absorbing liquid (A1'+A2') introduced from the second heat exchanger 30 into the upper portion of the first regenerating section 22a. Expressions of $t1>T3>T4$ and $t1>t2$ are also satisfied in which T3 represents the temperature of the absorbing liquid A1' in the liquid reservoir that has been heated in the second regenerating section 22b by the gas discharged from the first regenerating section 22a, T4 represents the temperature of the absorbing liquid A1 introduced from the first heat exchanger 29 into the second regenerating section 22b, t1 represents the temperature of the gas discharged from the first regenerating section 22a into the second regenerating section 22b, and t2 represents the temperature of the gas discharged from the second regenerating section 22b. In general, the absorbing liquid in the regeneration column is heated to a temperature close to the boiling point of the absorbing liquid in order to heighten the regeneration degree thereof. When a heat exchanger being high in heat exchanging performance is used to heighten the recovery ratio of heat to make the temperature difference (T1−T2) small, the temperature t1 of the gas discharged from the first regenerating section 22a also becomes high. If the gas is discharged from the regeneration column 20 as it is, a large quantity of energy corresponding to the latent heat is also discharged, together with water vapor, as well as energy corresponding to the sensible heat. In the present invention, the heat quantity of the gas discharged from the first regenerating section 22a is recovered in the second regenerating section 22b to be used for the regeneration of the absorbing liquid, so that the temperature of the gas is lowered from t1 to t2 to reduce the quantity of the discharge of the sensible heat to the outside. Following the lowering in the gas temperature, the condensation of water vapor also advances, so that the water vapor and latent heat contained in the gas discharged from the second regenerating section 22b are also decreased. In the above-mentioned structure, condensed water from water vapor vaporized from the absorbing liquid is, in the absorption column 10, supplied to the absorbing liquid A2' in the second absorbing section 12b while the condensed water is supplied, in the regeneration column 20, to the absorbing liquid A1' in the second regenerating section 22b. Accordingly, in the circulation system, even when the quantity vaporized from absorbing liquid A2 in the first regenerating section 22a exceeds the quantity of condensed water supplemented in the second absorbing section 12b, the quantity of the condensed water is added to a part of the absorbing liquid in the second regenerating section 22b while that the part branched flows in the branched path and is joined again with the main flow. Thus, the absorbing liquid is kept at a predetermined concentration.

When a heat exchanger high in heat exchanging performance is used as the second heat exchanger 30, in the absorbing liquid part (A1'+A2') in the path L2 extended from the second heat exchanger 30 to the first regenerating section 22a, bubbles of carbon dioxide are easily generated by a rise in the temperature. Thus, a case may occur where the bubbles hinder the conduction of heat so that a decrease in the temperature difference (T1−T2) is disturbed. In this case, the bubbles are possibly restrained by introducing the absorbing liquid into the second heat exchanger 30 in the pressurized state, so that the disturbance of the temperature rise of the absorbing liquid is cancelled. Consequently, the heat exchanging performance is projected onto the temperature difference between the heat exchanger inlet temperature of the lean solution and the heat exchanger outlet temperature of the semi-rich (or semi-lean) liquid, so that this temperature difference is reduced. Thus, thermal energy given by the heat exchanger is efficiently supplied into the regeneration stage. The above-described temperature difference at the heat exchange can be generally set to a temperature lower than 10° C., preferably about 3° C. In regard to the pressure applied to the absorbing liquid, it also works effective for promoting the discharge of carbon dioxide if it is released when the absorbing liquid is charged into the regeneration stage. For pouring the absorbing liquid into the second heat exchanger 30 in the state that the absorbing liquid is pressurized, for example, a back pressure valve is fitted onto the path L2 (for example, in the vicinity of an introduction port into the regenerating section 22a) between the second heat exchanger 30 and the regeneration column 20, whereby it is made possible to use the driving force of the pumps 16 and 27 for pressurizing the absorbing liquid. In this case, the pressure can also be adjusted, using a pressure sensor. Similarly, it is also possible, for the absorbing liquid passing through the first heat exchanger 29, to restrain the bubbling by means of pressurization so that a rise in the temperature of the absorbing liquid A1 supplied into the second regenerating section 22b can easily be attained. If the pressure of the absorbing liquid in the pressurized state is released when the absorbing liquid is introduced into the regeneration column, the discharge of carbon dioxide is promoted. At this time, latent heat is consumed to produce a further advantageous effect of contributing to a lowering in the temperature of the discharged gas.

The recovery method performed in the recovery apparatus 1 in FIG. 1 will be described.

In the absorption column 10, the gas G which contains carbon dioxide, such as a combustion exhaust gas or process exhaust gas, is supplied thereto through the bottom portion. The absorbing liquids A2' and A2 are supplied to the first and second absorbing sections 12a and 12b, respectively, through the respective upper portions thereof. As a result, the gas G is brought into gas-liquid contact on the fillers 11a and 11b with the absorbing liquids A2' and A2 to perform an absorption treatment composed of a first absorbing step in the first absorbing section 12a and a second absorbing step in the second absorbing section 12b, so that carbon dioxide is absorbed into the absorbing liquids. Since carbon dioxide is satisfactorily absorbed at a low temperature, the liquid temperature of the absorbing liquids A1 and A2 or the temperature of the absorption column 10 (in particular, the fillers 11a and 11b) is generally adjusted to about 50° C. or lower, preferably 40° C. or lower. Since the absorbing liquids absorb carbon dioxide with generating heat, it is desired to pay attention to a matter that the liquid temperature should not be over 60° C., considering a rise in the liquid temperature by this heat generation. It is also appropriate, in regard to the gas G supplied into the absorption column 10, to use a cooling column to adjust the temperature thereof beforehand to an appropriate temperature, considering the above. For the absorbing liquid, an aqueous liquid containing, as an absorbent, a compound having affinity with carbon dioxide is possibly used, respectively. For the absorbent, alkanolamines, hindered amines having an alcoholic hydroxyl group, and the like can be mentioned, and specific examples thereof include monoethanolamine, diethanolamine, triethanolamine, N-methyldietanolamine (MDEA), diisopropanolamine, and diglycolamine, which belong to alkanolamines; and 2-amino-2-methyl-1-propanol (AMP), 2-(ethylamino)ethanol (EAE), and 2-(methylamino) ethanol (MAE), 2-(isopropylamino)ethanol (IPAE), which belong to hindered amines each having an alcoholic hydroxyl group. It is allowed to combine two or more kinds of the compounds as mentioned above to use in a mixture form. A cyclic amine may be used to be added/incorporated thereto, examples thereof including piperidine, piperazine, pyridine, pyrimidine, pyrazine, 3-methylpyridine, 2-methylpyrazine, 2-(methylamino)piperidine (2AMPD), 2-methylpiperazine, 2-(aminomethyl)piperazine, 2,6-dimethylpiperazine, 2,5-dimethylpiperazine, and 2-(β-hydroxyethyl) piperazine. Monoethanolamine (MEA), which is in general favorably used, is an absorbent which is high in absorbing performance, while AMP or MDEA is an absorbent good in regeneration property. In order to improve AMP or MDEA in absorbing performance, an absorbing liquid is frequently prepared by blending MEA thereinto. In accordance with the blend ratio, the absorbing performance and the regeneration property can be adjusted to some degree. The absorbent concentration in the absorbing liquid may be appropriately set in accordance with the quantity of carbon dioxide contained in the gas which is a target to be treated, and the treating speed, the fluidity of the absorbing liquid, a consumption loss restraint thereof, and others. The absorbent is generally used in a concentration of about 10 to 50% by mass. For treatment of the gas G in which the content by percentage of carbon dioxide is, for example, about 20%, an absorbing liquid having the concentration of about 30% by mass is favorably used.

The supplying rate of the gas G, and the circulating rates of the absorbing liquid are appropriately set, respectively, so that the absorption is advanced satisfactorily, in view of the amount of carbon dioxide contained in the gas G, the carbon dioxide absorption capacity of the absorbing liquids, the gas-liquid contact efficiency in the filler, and others. By circulating the absorbing liquid in each path, an absorption treatment and a regeneration treatment are repeatedly performed.

The regeneration treatment for the absorbing liquid in the regeneration column 20 has a first regenerating step for heating the absorbing liquid by external heating in the first regenerating section 22a, and a second regenerating step for heating the absorbing liquid by use of heat of a gas discharged from the first regenerating step in the second regenerating section 22b. A part of absorbing liquid A2' (semi-rich solution) that has absorbed carbon dioxide in the second absorbing step is supplied from the tank 14 through the path L2 to the first regenerating step in the first regenerating section 22a. The other part of absorbing liquid A2' flows from the tank 14 through the first absorbing step in the first absorbing section 12a and the second regenerating step in the second regenerating section 22b, and is then joined, as absorbing liquid A1' (semi-lean solution), with absorbing liquid A2' in the path L2 to be directed to the first regenerating section 22a. Before the absorbing liquid A1' in the path L5 is joined with absorbing liquid A2' in the path L2, the absorbing liquid A1' is subjected, in a first heat exchange step through the first heat exchanger 29, to heat exchange with the absorbing liquid A1 in the path L4 before the liquid A1 is supplied to the second regenerating step. The absorbing liquid (A2'+A1') obtained by the joint in the path L2, before being supplied to the first regenerating step in the first regenerating section 22a, is heated, in a second heat exchange step through the second heat exchanger 30, by heat exchange with the absorbing liquid A2 which flows back through the first regenerating step in the regeneration column 20. The temperature T1 of the second absorbing liquid A2 heated by external heat at the first regenerating step in the first regenerating section 22a is varied in accordance with composition of the used absorbing liquid and regenerating conditions. The temperature T1 is generally set into the range of about 100 to 130° C. (the boiling point or thereabout). On the basis of this, the heat exchanger outlet temperature of the absorbing liquid (A2'+A1') at the second heat exchange step, that is, the introduction temperature T2 thereof into the second regenerating section 22a can be set into the range of about 95 to 125° C. The temperature t1 of the gas discharged from the first regenerating section 22a to the second regenerating section 22b turns into the range of about 85 to 115° C. The temperature T3 of the absorbing liquid A1' heated in the second regenerating section 22b by the gas discharged from the first regenerating section 22a turns into the range of about 85 to 115° C. This absorbing liquid A1', before being joined to the path L2 from the tank 24, is cooled in the first heat exchange step by heat exchange with the absorbing liquid A1 which is supplied from the absorption column 10 to the regeneration column 20, which makes it possible to set, into the range of about 80 to 110° C., the temperature T4 of the absorbing liquid A1 introduced into the second regenerating section 22b. The temperature t2 of the gas discharged from the second regenerating section 22b is possibly lowered to 100° C. or lower.

In a circulating step in which the absorbing liquid is circulated in the circulation system formed by the paths L1, L2 and L7, S represents the flow rate of the absorbing liquid flowing in the path before the point where the absorbing liquid flow is branched and in the path after the point where the branch flow is joined with the main flow (for example, the flow rate of absorbing liquid A2 in the path L7), and ΔS represents the flow rate in the branch flow step after the branching, that is, the flow rate of absorbing liquid A1 or A1' flowing in the paths L3 to L6 in the branch flow system. Under this promise, the ratio of the flow rate ΔS to the flow rate S, the ratio of ΔS/S, is appropriately set, considering the amount of carbon dioxide in gas G, the absorbing performance and the regeneration property of the absorbing liquid, and others. From the viewpoint of the quantity of heat recovered in the second regenerating section 22b, in general, the ratio is properly from about 1/10 to 9/10. The ratio is preferably set into the range of about 3/10 to 8/10. In accordance with the setting of the flow rate ratio ΔS/S, a difference in carbon dioxide content by percentage is varied between the absorbing liquid A2' (semi-rich solution) supplied from the tank 14 to the first regenerating section 22a, and the absorbing liquid A1' (semi-lean solution) flowing from the tank 24 to be joined into the path L2. From the viewpoint of the regeneration efficiency of the absorbing liquid, it is preferred that this difference is small. The flow rates S and ΔS are adjustable by controlling the driving of pumps 16 to 18, 27 and 28. At this time, appropriate values of the flow rates in a stationary state can be set by detecting the liquid surface levels of the tanks 14 and 24 and taking a driving balance between the pumps in accordance with respective fluctuations in these levels. Thus, in the case of knowing, in advance, pumps-driving conditions for circulating the absorbing liquid parts to give the appropriate flow rates, the tanks 14 and 24 can be omitted.

In the case of pressurizing at least one of the absorbing liquid A1 and the absorbing liquid (A1'+A2') flowing in the first and second heat exchangers 29 and 30, respectively, it is appropriate to render the pressure a constant pressure of 150 kPaG or more, preferably 200 kPaG or more, more preferably 250 kPaG or more provided that the pressure is about 900 kPaG or less, in view of the pressure resistance of the apparatus and others).

The absorbing liquid A2 stored in the bottom portion of the regeneration column 20 is heated to the boiling point or thereabout by partial circulation heating. At this time, the boiling point of the absorbing liquid depends on the composition (absorbent concentration) and the pressure in the regeneration column 20. For the heating, necessary is the supply of vaporization latent heat of water, which is lost from the absorbing liquid, and sensible heat of the absorbing liquid, and, if the vaporization is restrained by increasing the pressure, the sensible heat is increased by a rise in the boiling point. Therefore, in view of the balance between them, it is preferred for energy efficiency to use the condition setting that the pressure in the regeneration column 20 is increased to about 100 kPaG and the absorbing liquid is heated into the range of 120 to 130° C.

In the second regenerating section 22b, the regeneration is performed at a temperature lower than that of the first regenerating section 22a, thereby making it possible to lower the temperature t2 of the upper portion of the regeneration column 20 to a temperature close to the temperature T4 of the poured absorbing liquid A1 (t2<t1, and T4<T3<t1). Consequently, the water vapor and the latent heat contained in the recovered gas passing through the cooling condenser section 37 are decreased so that a loss of heat energy is reduced. In order to promote the regeneration of the absorbing liquid at a low temperature, it is important that the carbon dioxide content in the poured absorbing liquid is high. In this regard, the absorbing liquid A2 which has contacted the gas high in carbon dioxide concentration in the first absorbing section 12a easily becomes to have a relatively high content of carbon dioxide, and such an absorbing liquid is thus suitable for performing the regeneration with use of heat recovered in the second regenerating section 22b.

In this way, the absorbing liquid is circulated between the second absorbing section 12b of the absorption column 10 and the first regenerating section 22a of the regeneration column 20 while a part thereof flows through the first absorbing section 12a and the second regenerating section 22b in the branch flow system, whereby the absorbing liquid emits, at a low temperature, carbon dioxide which has absorbed into a higher concentration. As a result, the energy efficiency of the regeneration column is improved by heat-use in the second regenerating section 22b for attaining the regeneration at a lower temperature than that of the first regenerating section 22a. In other words, a circulation system for performing a main absorption-regeneration is formed in the circulating path formed by the paths L1, L2 and L7, and a branch flow system is formed in the branched path formed by the paths L3 to L6 in which thermal energy in the regeneration column is recovered and re-used and further an absorption burden given to the absorbing liquid by gas G of high carbon dioxide concentration is decreased. Consequently, the apparatus structure in FIG. 1 is also effective for raising the treatment adaptability of the recovery apparatus.

In a recovery apparatus having a conventional type of absorption column and regeneration column, an effect of the heat-exchanging efficiency of its heat exchanger is evaluated on the supposition that, in a process-simulator-used calculation for calculating regeneration energy required for the recovery of carbon dioxide, a 30% MEA solution in water is used as an absorbing liquid to treat a carbon-dioxide-containing gas into a carbon dioxide recovery ratio of 90%. In that case, when increasing the heat exchange performance (represented by a difference between the heat exchange inlet temperature of its return path and the heat exchange outlet temperature of its supplying path) of the heat exchanger from 10° C. to 3° C., the rich solution introduction temperature of the regeneration column is raised by 7° C. (the temperature is presumed to be 118° C.) and the regeneration energy is lowered from about 4.1 GJ/t-$CO_2$ to about 3.9 GJ/t-$CO_2$ by decrease of a sensible heat required for the temperature rise. In order to evaluate the structure of the present invention, another absorbing section and another regenerating section for changing a recovery apparatus into the apparatus structure illustrated in FIG. 1 are added to be rendered as a first absorbing section and a second regenerating section, and a branch path which is branched from the first circulating path of the absorbing liquid is provided to join after passing through the first absorbing section and the second regenerating section. In this structure, the regeneration energy can be reduced to about 3.2 GJ/t-$CO_2$ by a contribution of a decreased quantity of the vaporization latent heat. Furthermore, the structure is changed to a recovery apparatus 6 in FIG. 6, which will be detailed later, by dividing the inside of the regeneration column into three regenerating sections. In this case, the regeneration energy can be decreased to about 3.1 GJ/t-$CO_2$. Moreover, when the absorbing liquid used in the apparatus structure in FIG. 1 is changed to another absorbing liquid that is good in regeneration property, the regeneration energy can be decreased to about 2.3 GJ/t-$CO_2$.

Figure 2:
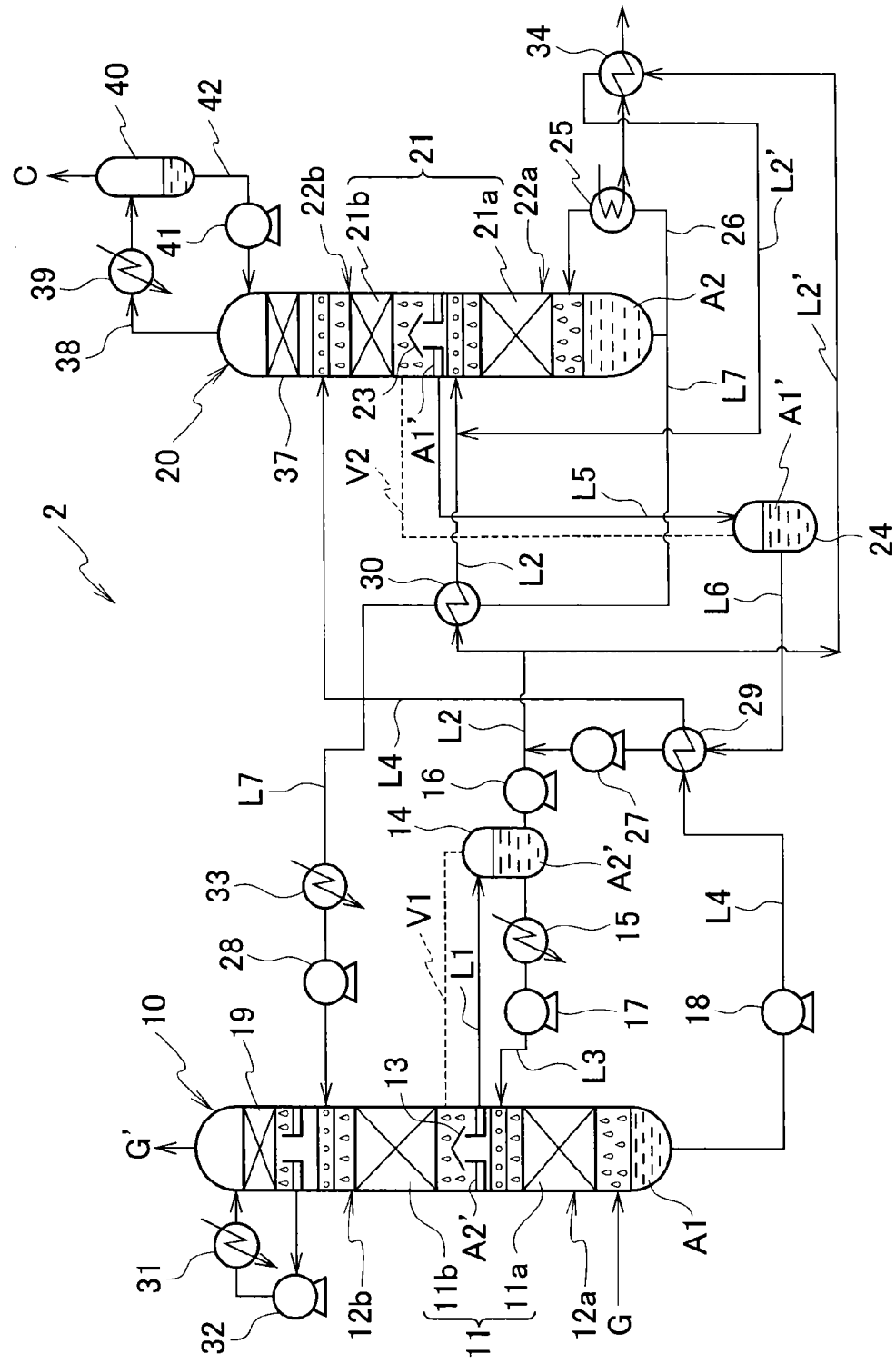
FIG. 2 is a schematic configuration diagram showing a second embodiment of the carbon dioxide recovery apparatus according to the present invention.

FIG. 2 shows a second embodiment of the recovery apparatus for performing the carbon dioxide recovery method of the present invention. In the recovery apparatus 2 in FIG. 2, a branched path L2' branched from a path L2, and a heat exchanger 34 are provided, and a part of absorbing liquid (A2'+A1') supplied from tanks 14 and 24 to the path L2 is supplied, without being introduced into the second heat exchanger 30, into the heat exchanger 34, so as to be heated by heat exchange using afterheat of steam-condensed water discharged from a steam heater 25. The absorbing liquid heated in the heat exchanger 34 is joined with the absorbing liquid in the path L2 to be supplied into the first regenerating section 22a.

Even after heating the absorbing liquid A2, the high-temperature steam in the steam heater 25 is steam-condensed water having a sufficiently high temperature of about 120° C. or higher. Thus, the steam is effectively usable as a source for heating the absorbing liquid to be supplied into a regeneration column 20. In other words, in the structure in FIG. 2, a role of the second heat exchanger 30 for heating the absorbing liquid supplied through the path L2 into the first regenerating section 22a is partially shared with the heat exchanger 34. Accordingly, as the second heat exchanger 30, smaller one is usable.

In the recovery apparatus 2 in FIG. 2, others than the above-mentioned matters are the same as those in the recovery apparatus 1 in FIG. 1. Thus, description thereof is omitted.

Figure 3:
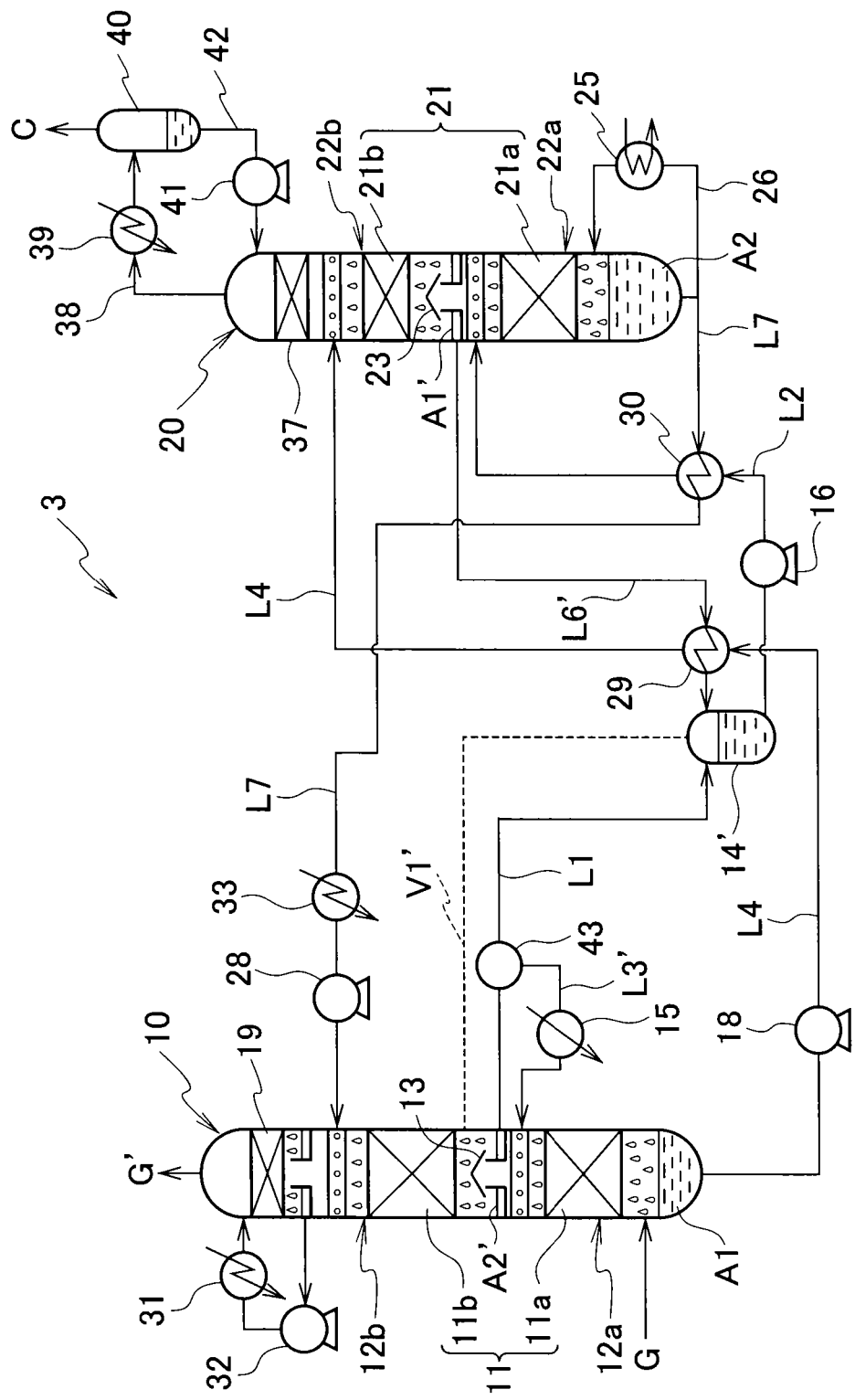
FIG. 3 is a schematic configuration diagram showing a third embodiment of the carbon dioxide recovery apparatus according to the present invention.

FIG. 3 shows a third embodiment of the recovery apparatus for performing the carbon dioxide recovery method of the present invention. In the recovery apparatus 3 in FIG. 3, its structure is simplified by decreasing the respective numbers of pumps and tanks. Namely, in the recovery apparatus 3, the branch point of the branch flow system is located, not at the tank, but at the path L1, to divide, into two flows, the absorbing liquid A2' which is introduced from the liquid reservoir of the second absorbing section 12b through the path L1 to the outside of the absorption column 10. The joining point of the branch flow system is located, not at the path L2, but at a tank 14' so that the branch flows through the first absorbing section 12a and the second regenerating section 22b. In this way, the tank 14' in the recovery apparatus 3 in FIG. 3 is configured to unify the tanks 14 and 24 in the recovery apparatus 1 of FIG. 1, thus omitting the tank 24. As a result, the pump 27 in FIG. 1 is also omitted. The present apparatus is configured in such a manner that the pump 17 at the path L3 in FIG. 1 can also be omitted.

Specifically, the absorbing liquid A2' flowing out from the second absorbing section 12b through the path L1 is divided into two flows at a three-way valve 43 located at the branch point of the path L1. A part of the absorbing liquid A2' flows down through the path L1 to be stored in the tank 14'. The other part is supplied through a path L3' into the first absorbing section 12a, while it is cooled by a cooler 15. The absorbing liquid A2' can be supplied from the second absorbing section 12b into the tank 14' and first absorbing section 12a by means of a gravity drop. Thus, the use of any pump can be omitted in the paths L1 and L3'. By adjusting the three-way valve 43, the distribution ratio of absorbing liquid A2' is controllable. Furthermore, the absorbing liquid A1' introduced from the second regenerating section 22b through a path L6' to the outside of a regeneration column 20 also flows down by a gravity drop, to be stored in the tank 14'. In this portion, the absorbing liquid A1' is joined with the part of absorbing liquid A2' supplied through the path L1. In other words, the tank 14' functions as both of the tanks 14 and 24 in FIG. 1, and the absorbing liquid A2' and the absorbing liquid A1' are joined with each other in the tank 14'. Consequently, the pump for supplying the absorbing liquid A1' from the tank 24 to the path L2 in FIG. 1 is unnecessary in FIG. 3.

Absorbing liquid (A1'+A2') in the tank 14' is supplied through the path L2 into a first regenerating section 22a by a pump 16. During this period, in a second heat exchanger 30, this absorbing liquid is subjected to heat exchange with the absorbing liquid A2 which flows back from the first regenerating section 22a through a path L7 into a second absorbing section 12b. In a first heat exchanger 29, the absorbing liquid A1' flowing from the second regenerating section 22b through the path L6' is subjected to heat exchange with the absorbing liquid A1 flowing out through a path L4 from the bottom of the absorption column 10. These structures are identical with those of the recovery apparatus 1 in FIG. 1 except that the absorbing liquid A1' flowing out from the second regenerating section 22b is not stored in any tank before the heat exchange. Also in the tank 14', its top is connected to a ventilating pipe V1' connected to the second absorbing section 12b in order to eliminate a pressure fluctuation in the tank 14'.

The absorbing liquid A2 (lean solution), from which carbon dioxide has been sufficiently emitted, stored on the bottom portion of the regeneration column 20 is caused to flow back by the pump 28, through the path L7 connected between the upper region of the absorption column 10 and the bottom region of the regeneration column 20, to the upper region of the second absorbing section 12b of the absorption column 10. As a result, the paths L1, L2 and L7 form a circulating path between the second absorbing section and the first regenerating section to constitute a circulation system in which the absorbing liquid as absorbing liquid A2 or A2' goes and returns through the paths L1, L2 and L7 between the second absorbing section 12b and the first regenerating section 22a. Moreover, the paths L3', L4 and L6' form a branch path which is branched from the circulating path and which is connected to the circulation system so as to extend from the second absorbing section 12b through the first absorbing section 12a and the second regenerating section 22b and then reaches the first regenerating section 22a. The absorbing liquid as absorbing liquid A1 or A1' flows through the paths L3', L4 and L6', separating from the circulation system, and then joined, through the first absorbing section 12a and the second regenerating section 22b, with the circulation system. In this way, a branch flow system is formed.

While the absorbing liquid A1', from which carbon dioxide has been emitted in the second regenerating section 22b, flows in the path L6', the absorbing liquid A1' passes through the first heat exchanger 29 to be subjected to heat exchange between the paths L4 and L6'. Accordingly, the absorbing liquid A1' is cooled by the absorbing liquid A1 in the path L4, to be joined, in the tank 14', with the absorbing liquid A2' in the path L1. Furthermore, while the absorbing liquid A2, from which carbon dioxide has been emitted in the first regenerating section 22a, passes in the path L7, the absorbing liquid A2 passes through the second heat exchanger 30 and is subjected to heat exchange between the paths L7 and L2 in the second heat exchanger 30. Accordingly, the absorbing liquid A2 is cooled by the absorbing liquid (A1'+A2') in the path L2, further sufficiently cooled in a cooler 33 using cooling water, and then introduced into the upper region of the second absorbing section 12b.

In the recovery apparatus 3 in FIG. 3, others than the above-mentioned matters are the same as in the recovery apparatus 1. Thus, a description thereabout is omitted. In the recovery apparatus 3 in FIG. 3 also, a modification as made in the recovery apparatus 2 in FIG. 2 may be made. Specifically, a branch path and a heat exchanger may be provided to configure in such a manner that the absorbing liquid to be supplied from the tank 14' through the path L2 into the first regenerating section 22a is divided, before supplied into the second heat exchanger 30, into the main and a part, and this part of the absorbing liquid is then heated by heat discharged from a steam heater 25, to be subsequently joined into the path L2 at the downstream side of the second heat exchanger 30. In this way, it is possible to reduce the size of the second heat exchanger 30.

Figure 4:
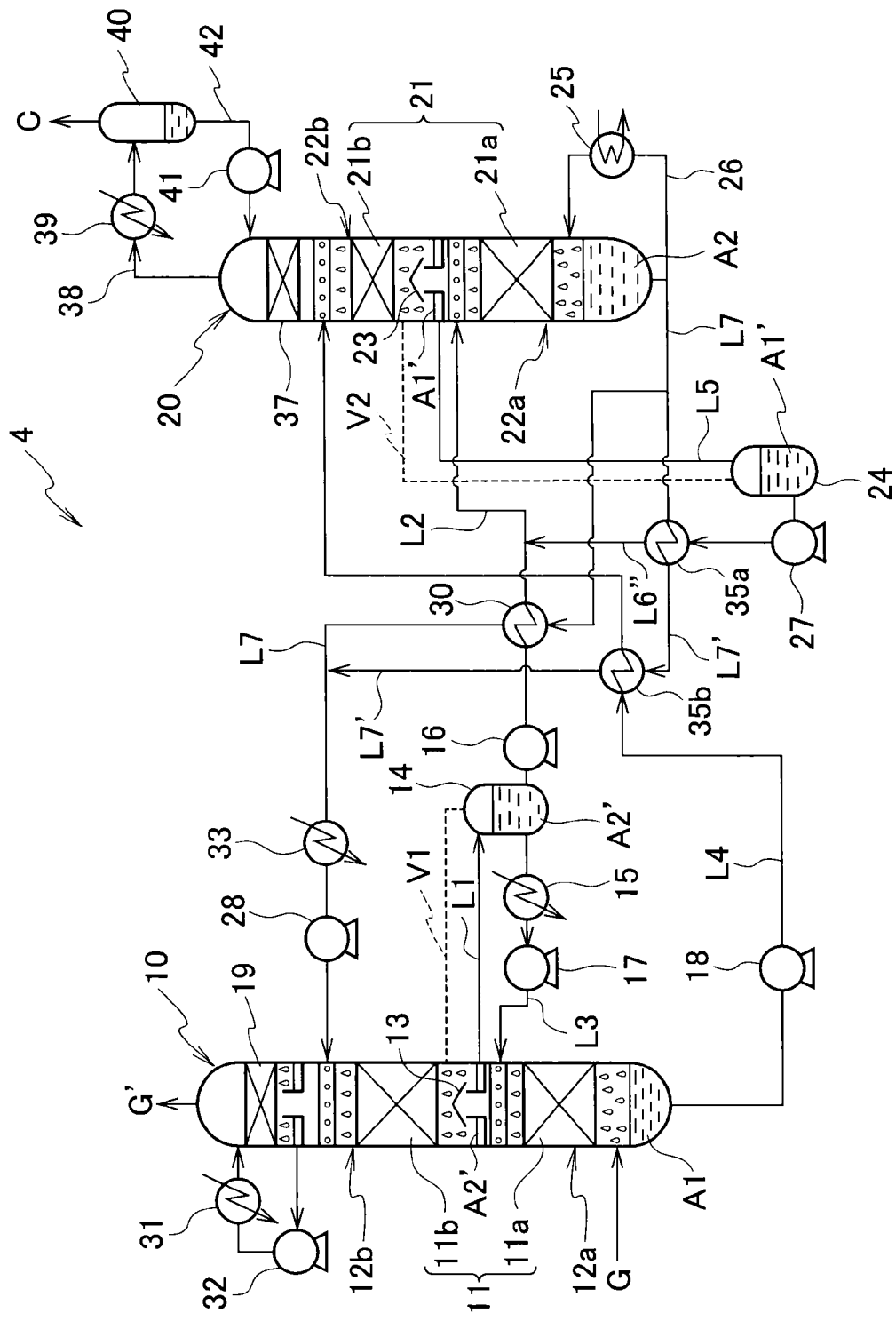
FIG. 4 is a schematic configuration diagram showing a fourth embodiment of the carbon dioxide recovery apparatus according to the present invention.

FIG. 4 shows a fourth embodiment of the recovery apparatus for performing the carbon dioxide recovery method of the present invention. This embodiment has a structure for improving the heat exchange of absorbing liquid A1' to be supplied from the tank 24 to the path L2 in the recovery apparatus in FIG. 1. Specifically, in FIG. 1, the absorbing liquid A1' to be supplied from the tank 24 to the path L2 is once cooled in the heat exchanger 29, and is then joined into the path L2 in which the absorbing liquid is again heated in the heat exchanger 30. It is however preferred, from the viewpoint of restraining a deterioration of the absorbing liquid and other viewpoints, to join the absorbing liquid into the path L2 without being cooled. For such a structure, a branch path L7' is branched from a path L7 extending from the first regenerating section 22a to the second absorbing section 12b, and the absorbing liquid A1' in a tank 24 is heated by means of heat exchange with the branched path L7', and then caused to be joined with a path L2.

Specifically, two heat exchangers 35a and 35b are fitted to the branch path L7' branched from the path L7 extending from the first regenerating section 22a to the second absorbing section 12b, and in upstream-side one of the two, which is the heat exchanger 35a, heat exchange is made between the absorbing liquid A1' in a path L6" extending from the tank 24 to be joined into the path L2 and the absorbing liquid A2 flowing back from the regeneration column to the absorption column. The absorbing liquid A1' flowing the path L6" by a pump 27 is heated by the absorbing liquid A2, which has the highest temperature, to come to have a temperature equivalent to the heating temperature on the heat exchanger 30 at the path L6. Thus, by connecting the path L6" to a point of the path L2 at the downstream side of the heat exchanger 30, an effective heat-exchanging form is created. On the other hand, the temperature of the absorbing liquid A2 flowing the branch path L7' turns to a temperature close to that of the absorbing liquid A1' in the tank 24 by heat exchange in the heat exchanger 35a. Thus, by subjecting the absorbing liquid A2 to heat exchange in the downstream-side heat exchanger 35b with the absorbing liquid A1 in the path L4, conditions for the heat exchange become equivalent to those of the heat exchanger 29 in FIG. 1.

In the recovery apparatus 4 in FIG. 4, others than the above-mentioned matters are the same as in the recovery apparatus 1. Thus, a description thereabout is omitted. In the recovery apparatus 4 in FIG. 4 also, a modification as made in the recovery apparatus 2 in FIG. 2 may be made. Specifically, a branch path and a heat exchanger may be provided to configure in such a manner that the absorbing liquid A2' to be supplied from the tank 14 through the path L2 into the first regenerating section 22a is divided, before supplied into the second heat exchanger 30, into the main and a part, and this part of the absorbing liquid is then heated by heat discharged from a steam heater 25, to be subsequently joined into the path L2 at the downstream side of the second heat exchanger 30. In this way, it is possible to reduce the size of the second heat exchanger 30.

Figure 5:
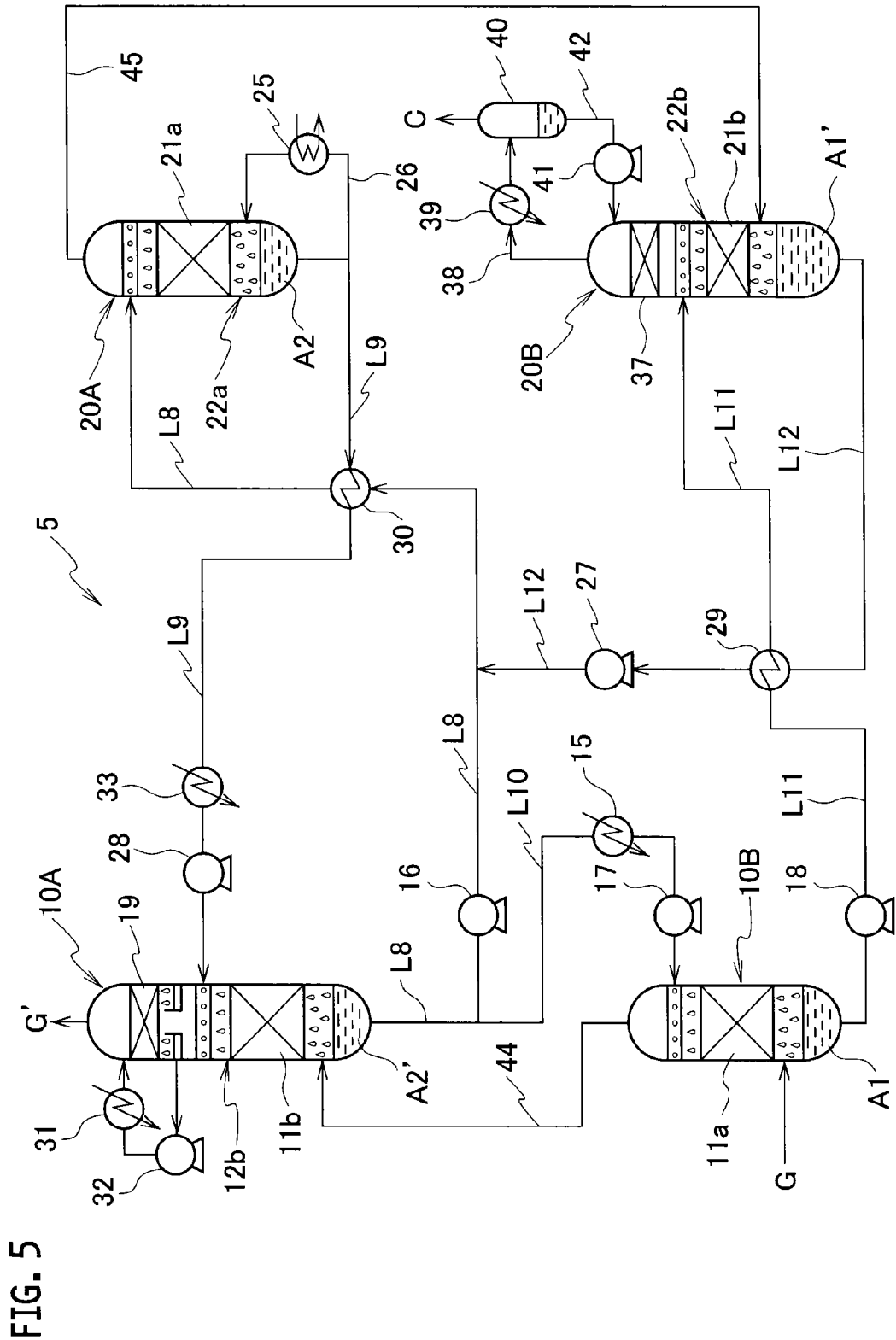
FIG. 5 is a schematic configuration diagram showing a fifth embodiment of the carbon dioxide recovery apparatus according to the present invention.

FIG. 5 shows a fifth embodiment of the recovery apparatus for performing the carbon dioxide recovery method of the present invention. This embodiment is an embodiment that can be formed by combining two recovery apparatuses with each other. The absorption column 10 of the recovery apparatus in FIG. 1 is constructed by using two independent absorption columns, and the first and second absorbing sections are distributed into the absorption columns, respectively. The regeneration column 20 is constructed by using two independent regeneration columns, and the first and second regenerating sections are distributed into the regeneration columns, respectively. These columns are connected to each other through pipes, so that the resultant recovery apparatus is formed to work equivalently to the recovery apparatus in FIG. 1. In other words, this embodiment is a useful embodiment capable of improving the treatment efficiency by adding another absorption column and another regeneration column to an already-existing recovery apparatus, or by using two already-existing recovery apparatuses. The recovery apparatuses are connected to each other to form one of the recovery apparatuses as a circulation system and form the other as a branch flow system, thus making it possible to recover carbon dioxide.

Specifically, an absorption column 10A has the same structure as the absorption column 10 in FIG. 10, excepting that the first absorbing section 12a and the partitioning member 13 are not provided. A regeneration column 20A is made only of the first regenerating section 22a and its lower regions of the regeneration column 20 in FIG. 1. An absorption column 10B is made only of the first absorbing section 12a and its lower regions of the absorption column 10 of FIG. 1. A regeneration column 20B has the same structure as the regeneration column 20 of FIG. 1, excepting that the first regenerating section 22a and the partitioning member 23 are not provided. The top of the absorption column 10B is connected to a lower region of the absorption column 10A through a pipe 44. By supplying gas G into a lower region of the absorption column 10B, gas G is passed through a first absorbing section 12a of the absorption column 10B and a second absorbing section 12b of the absorption column 10A successively. Gas G' from which carbon dioxide has been removed is discharged through the top of the absorption column 10A. Furthermore, the top of the regeneration column 20A is connected to a lower region of the regeneration column 20B through a pipe 45. A carbon-dioxide-containing recovery gas C generated in the regeneration column 20B by heating by a steam heater 25 passes through the pipe 45, and it is supplied into the lower region of the regeneration column 20B. The gas is then discharged through the exhaust pipe 38 being connected to the top of the regeneration column 20B, via a cooler 39 and a gas-liquid separator 40.

Paths L8 and L9 form a circulating path between the absorption column 10A and the regeneration column 20A to constitute a circulation system in which an absorbing liquid is circulated, as the absorbing liquid A2' on the bottom portion of the absorption column 10A or the absorbing liquid A2 on the bottom portion of the regeneration column 20A, through the paths L8 and L9 between a second absorbing section 12b and the first regenerating section 22a. Pumps 16 and 28 are provided on the paths L8 and L9, respectively. Paths L10, L11 and L12 form a branch path which is branched from the path L8 and connected to the path L8 via the absorption column 10B and the regeneration column 20B. Pumps 17, 18 and 27 are arranged at the paths L10, L11 and L12, respectively. A part of the absorbing liquid A2' (semi-rich solution) on the bottom portion of the absorption column 10A flows through the path L10 to be supplied into the absorption column 10B, and it absorbs carbon dioxide in the first absorbing section 12a. The absorbing liquid (rich solution) A1 on the bottom portion of the absorption column 10B flows through the path L11 to be supplied into the regeneration column 20B and regenerated in the second regenerating section 22b. Thereafter, it is caused to flow back, as semi-lean absorbing liquid A1' from the bottom of the regeneration column 20B, through the path L12 into the path 8 to be supplied into the first regenerating section 22a of the first regeneration column 20A. Thus a branch flow system is formed, accordingly. In the branch flow system, heat exchange is made between the paths L11 and L12 by a first heat exchanger 29. In the circulation system, heat exchange is made between the paths L8 and L9 by a second heat exchanger 30.

In the embodiment of FIG. 5, the absorbing liquid is stored on the bottom portions of the absorption column 10A and absorption column 10B. Thus, this storing performance fulfils the roles of the tanks 14 and 24 in FIG. 1. Accordingly, the tank 14 and the tank 24 are unnecessary for the recovery apparatus 5. When a conventional recovery apparatus is used to constitute the recovery apparatus of FIG. 5, it is advisable, for example, to use the conventional recovery apparatus as the absorption column 10B and the regeneration column 20B of the branch flow system, add thereto the absorption column 10A and the regeneration column 20A, and connect thereto the paths for the absorbing liquid and the gas-flow pipes, thereby constituting the circulation system.

In the recovery apparatus 5 of FIG. 5, others than the above-mentioned matters are the same as in the recovery apparatus 1 of FIG. 1. Thus, a description thereabout is omitted. In the recovery apparatus 5 of FIG. 5 also, a modification as made in the recovery apparatus 2 of FIG. 2 may be made. Specifically, a branch path and a heat exchanger may be provided to configure in such a manner that the absorbing liquid (A1'+A2') to be supplied through the path L8 into the first regenerating section 22a is divided, before supplied into the second heat exchanger 30, into the main and a part, and this part of the absorbing liquid is then heated by heat discharged from a steam heater 25, to be subsequently joined into the path L8 at the downstream side of the second heat exchanger 30. In this way, it is possible to reduce the size of the second heat exchanger 30. Alternatively, it is allowable to set a heat exchanger to heat the absorbing liquid A1' in the path L12, before joined into the path L8, by heat discharged from the steam heater 25, and shift the joint point between the paths L12 and L8 to a downstream position of the second heat exchanger 30. Alternatively, it is allowable, as same in the recovery apparatus 4 illustrated in FIG. 4, to provide a branch path which is branched from the path L9 in which the absorbing liquid A2 is caused to flow back from the first regenerating section 22a into the second absorbing section 12b, and change the heat exchange form to such a form that heat exchange is made with the paths L12 and L11 successively, so as to cause the absorbing liquid A1' in the path L12 to be joined into the path L8 without being subjected to any heat exchange with the path L11. Furthermore, the present embodiment may be carried out with use of the modification in FIG. 2 and the modification in FIG. 4 in combination. Specifically, instead of the first heat exchanger 29, two heat exchangers for attaining heating by means of heat discharged from the steam heater 25 are arranged, heat exchange with the absorbing liquid A1' in the path L12 is made on the upstream-side (high-temperature-side) one of these heat exchangers while heat exchange with the absorbing liquid A1 in the path L11 is made on the downstream-side (low-temperature-side) exchanger, and the path L2 at the downstream side of the upstream-side (high-temperature-side) heat exchanger is connected to the path L8 at the downstream side of the second heat exchanger 30. In this manner, the absorbing liquid A1' in the regeneration column 20B is heated as it is, without being cooled, to be supplied into the regeneration column 20A, and the thermal energy to be consumed in the branch flow system is supplied, using the waste heat.

Figure 6:
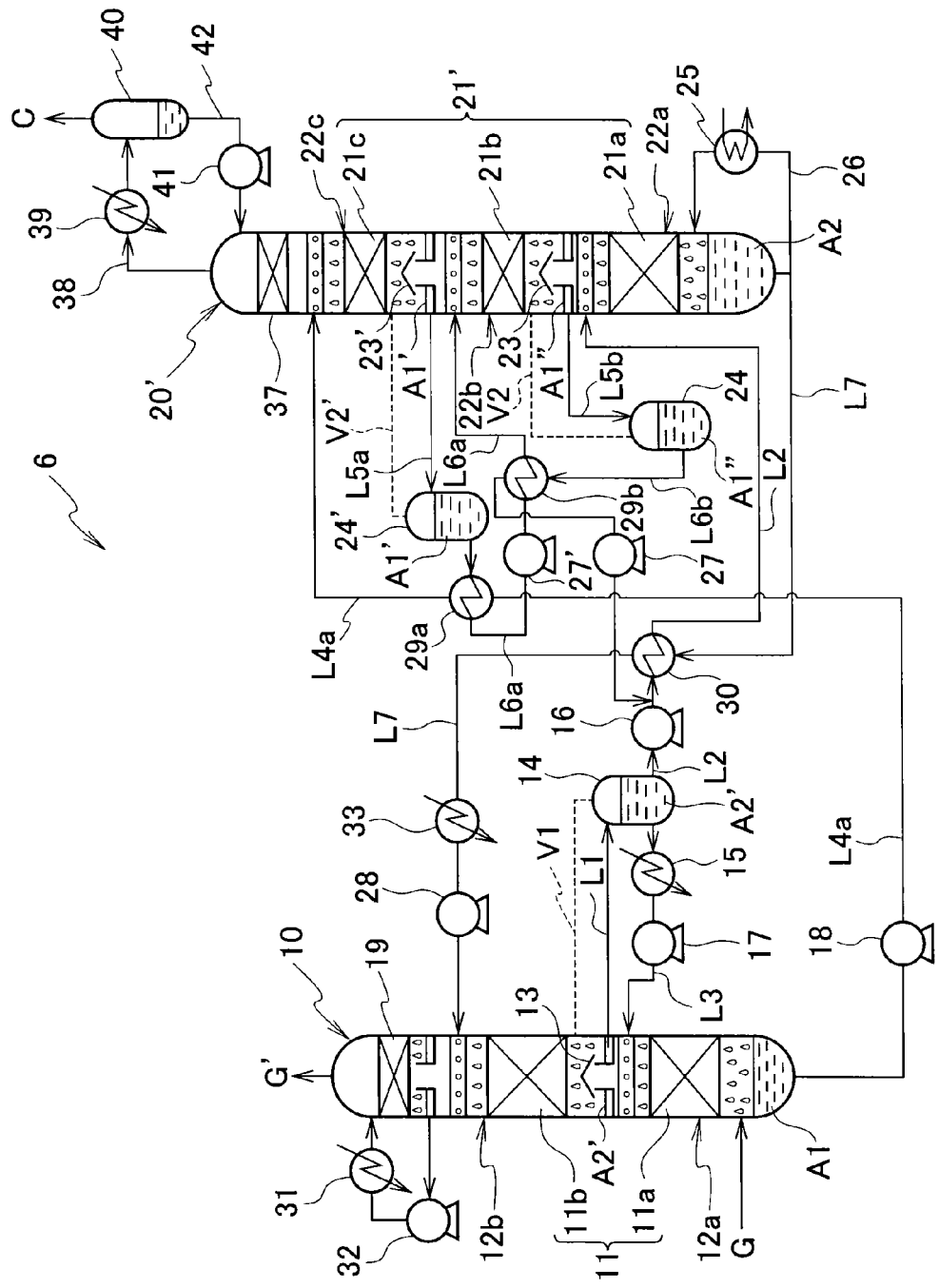
FIG. 6 is a schematic configuration diagram showing a sixth embodiment of the carbon dioxide recovery apparatus according to the present invention.

FIG. 6 shows a sixth embodiment of the recovery apparatus for performing the carbon dioxide recovery method of the present invention. In a recovery apparatus 6, an absorption column 10 has two absorbing sections in the same manner as illustrated in FIG. 1. However, its regeneration column 20' has three regenerating sections 22a, 22b and 22c which are filled with a filler 21', (21a, 21b and 21c) respectively. Between the second regenerating section 22b and the third regenerating section 22c, a partitioning member 23' is interposed which has the same structure as each of the above-mentioned partitioning members 13 and 23. In this embodiment, its circulation system is equivalent to that in the embodiment of FIG. 1, wherein the absorbing liquid as absorbing liquid A2 or A2' is circulated between the second absorbing section 12b and the first regenerating section 22a to make heat exchange in a second heat exchanger 30. However, its branch flow system is formed in such a manner that the absorbing liquid A2' in a tank 14 flows from a first absorbing section 12a to pass through the third regenerating section 22c, before supplied into the second regenerating section 22b. For this structure, a tank 24' having a ventilating pipe V2' is added in which the absorbing liquid regenerated in the third regenerating section 22c is to be stored. Instead of the first heat exchanger 29 in FIG. 1, two heat exchangers 29a and 29b are used and they are connected in such a manner to cause the absorbing liquid in the third regenerating section 22c to pass through the heat exchangers 29a and 29b while this absorbing liquid is supplied through the tank 24' to the second regenerating section 22b.

Specifically, in the branch flow system, the absorbing liquid A2' supplied from the tank 14 into the absorption column 10 absorbs carbon dioxide in the first absorbing section 12a to be stored on the bottom portion. The absorbing liquid (rich solution) A1 on the bottom portion is supplied into the third regenerating section 22c of the regeneration column 20' to emit carbon dioxide, and then stored in a liquid reservoir of the partitioning member 23'. The absorbing liquid A1' in the liquid reservoir is supplied through a path L5a into the tank 24'. The absorbing liquid A1' in the tank 24' flows through a path L6a by a pump 27' and it is supplied into the second regenerating section 22b. In this second regenerating section 22b, the absorbing liquid further emits carbon dioxide, and is then stored in a liquid reservoir of a partitioning member 23. Stored absorbing liquid A1" passes through a path L5b to be stored in a tank 24, and it flows through a path L6b by a pump 27 so as to be supplied into the path L2 of the circulation system and then supplied into the first regenerating section 22a. During this period, the absorbing liquid A1' flowing from the tank 24' through a path L6a is first subjected to heat exchange in the heat exchanger 29a with the absorbing liquid A1 in a path L4a, and further subjected to heat exchange in the heat exchanger 29b with the absorbing liquid A1" flowing from the tank 24 through the path L6b. By subjecting the absorbing liquid flowing in the branch flow system to these two regenerating steps, in which the carbon dioxide quantity is decreased, the absorbing liquid is changed from absorbing liquid A2, which is a rich solution, into semi-rich absorbing liquid A1' and absorbing liquid A1" successively. It is then joined into the path L2 to be supplied together with semi-rich absorbing liquid A2' into the first regenerating section 22a. In this way, the absorbing liquid is sufficiently regenerated to turn to absorbing liquid A2, which is a lean solution.

In the regeneration column 20', an expression of T1>T2 is satisfied wherein: T1 represents the temperature of the absorbing liquid A2 heated on the bottom portion of the first regenerating section 22a; and T2 represents that of the absorbing liquid (A1"+A2') introduced from the second heat exchanger 30 into the upper region of the first regenerating section 22a. Expressions of t1>T3>T4 and t1>t2 are also satisfied in which T3 represents the temperature of the absorbing liquid A1" in the liquid reservoir that is heated, in the second regenerating section 22b, by the gas discharged from the first regenerating section 22a; T4 represents that of the absorbing liquid A1' introduced from the first heat exchanger 29a into the second regenerating section 22b; t1 represents that of the gas discharged from the first regenerating section 22a into the second regenerating section 22b; and t2 represents that of the gas discharged from the second regenerating section 22b. Furthermore, expressions of t2>T5>T6, and t2>t3 are satisfied in which: T5 represents the temperature of the absorbing liquid A1' heated, in the third regenerating section 22c, by the gas discharged from the second regenerating section 22b; T6 represents that of the absorbing liquid part A1 introduced from the heat exchanger 29a into the upper portion of the third regenerating section 22c; and t3 represents that of the gas discharged from the third regenerating section 22c. If the temperatures of T1 to T4 and t1 and t2 of the recovery apparatus 6 in FIG. 6 are equal to the corresponding temperatures T1 to T4 and t1 and t2 of the recovery apparatus 1 in FIG. 1, the temperature of the gas discharged from the regenerating section is lowered from t2 to t3 and the discharge of sensible heat to the outside is further restrained. At this time, water vapor is also condensed to attain a further decrease in the quantity of water vapor contained in the gas discharged from the third regenerating section 22c. Thus, the discharge of latent heat to the outside is also restrained. In short, the heat recovered in the third regenerating section 22c results in the regeneration so that recovery and utilization of heat further proceeds.

The temperature of the absorbing liquid A1' flowing in the path L6a is once cooled from T4 down to a temperature close to the temperature of absorbing liquid A1 in the heat exchanger 29a, and then heated to a temperature close to the temperature T3 of absorbing liquid A1" in the heat exchanger 29b. The absorbing liquid A1" in the tank 24 is cooled to a temperature close to the temperature of absorbing liquid A1 in the heat exchanger 29b by heat exchange with the absorbing liquid A1' in the path L6a, and then joined with the absorbing liquid A2' in the path L2.

In a circulating step in which the absorbing liquid is circulated in the circulation system formed by the paths L1, L2 and L7, S represents the flow rate of the absorbing liquid flowing in the path before the point where the absorbing liquid flow is branched and in the path after the point where the branch flow is joined with the main flow, and $\Delta S$ represents the flow rate in the branch flow step after the branching, that is, the flow rate of the absorbing liquid flowing in the paths L3, L4a to L6a, and L5b to L6b in the branch flow system. Under this promise, the ratio of the flow rate $\Delta S$ to the flow rate S, the ratio of $\Delta S/S$, is appropriately set in this embodiment also, considering the amount of carbon dioxide in gas G, the absorbing performance and the regeneration property of the absorbing liquid, and others. From the viewpoint of the quantity of heat recovered in the second and third regenerating sections 22b and 22c, in general, that ratio is properly from about $1/10$ to $9/10$. The ratio is preferably set into the range of about $3/10$ to $8/10$.

In regard to the recovery apparatus 6 in FIG. 6, others than the above-described matters are the same as those in the recovery apparatus 1 in FIG. 1. Thus, description thereof is omitted. In the recovery apparatus 6 in FIG. 6 also, a modification as made in the recovery apparatus 2 in FIG. 2 may be made. Specifically, a branch path and a heat exchanger may be configured in such a manner that the absorbing liquid (A1"+A2') to be supplied through the path L2 into the first regenerating section 22a is divided into the main and a part, before supplied into the second heat exchanger 30, and that part of the absorbing liquid is heated by heat discharged from a steam heater 25, and it is subsequently joined into the path L2 at the downstream side of the second heat exchanger 30. In this way, it is possible to reduce the size of the second heat exchanger 30. Alternatively, it is allowable to set a heat exchanger to heat the absorbing liquid A1" passing through the heat exchanger 29b in the path L6b, before joined into the path L2, by heat discharged from the steam heater 25, and shift the joint point between the paths L6b and L2 to a downstream position of the second heat exchanger 30. Alternatively, it is allowable, as same in the recovery apparatus 4 illustrated in FIG. 4, to provide a branch path which is branched from the path L7 in which the absorbing liquid A2 is caused to flow back from the first regenerating section 22a into the second absorbing section 12b, and change the heat exchange form to such a form that heat exchange is made with the paths L6b and L6a successively, so as to cause the absorbing liquid A1" in the path L6b to be joined into the path L2 without being subjected to any heat exchange with the path L6a. Furthermore, the present embodiment may be carried out with use of the modification in FIG. 2 and the modification in FIG. 4 in combination. Specifically, instead of the heat exchangers 29a and 29b, three heat exchangers for attaining heating by means of heat discharged from the steam heater 25 are arranged. Then heat exchange with the absorbing liquid A1"

in the path L6b is made on the upstream-side (high-temperature-side) one of these heat exchangers while heat exchange with the absorbing liquid A1' in the path L6a is made on the middle-stream-side (middle-temperature-side) exchanger and heat exchange with the absorbing liquid A1 in the path L4a is made on the downstream-side (low-temperature-side) exchanger. And the path L6b at the downstream side of the upstream-side (high-temperature-side) heat exchanger is connected to the path L2 at the downstream side of the second heat exchanger 30. In this manner, the absorbing liquid A" in the tank 24 and the absorbing liquid A1' in the tank 24' are heated as they are, without being cooled, to be supplied into the first regenerating section 22a and the second regenerating section 22b, respectively, and the thermal energy to be consumed in the branch flow system is supplied, using the waste heat.

Figure 7:
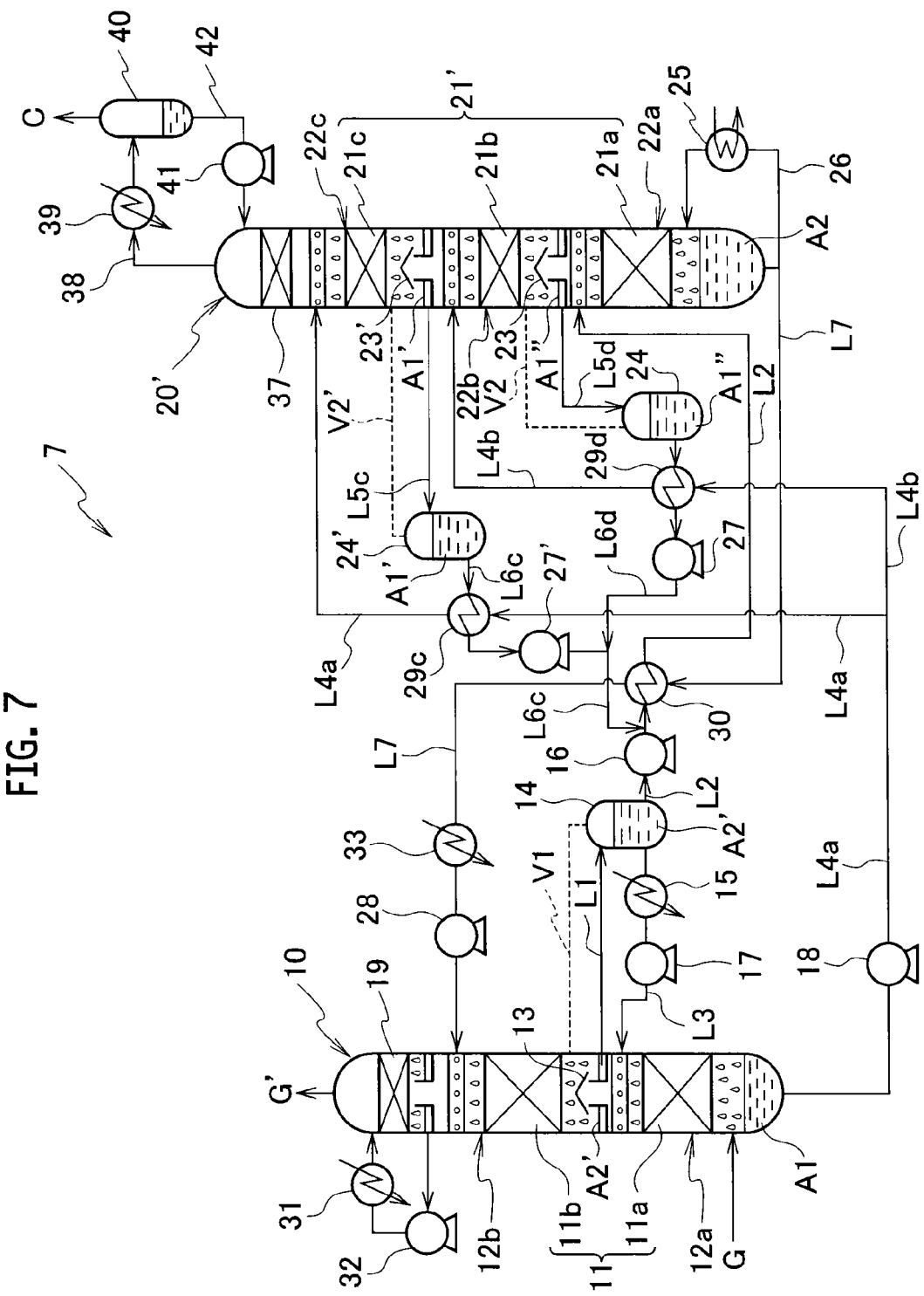
FIG. 7 is a schematic configuration diagram showing a seventh embodiment of the carbon dioxide recovery apparatus according to the present invention.

FIG. 7 shows a seventh embodiment of the recovery apparatus for performing the carbon dioxide recovery method of the present invention. In a recovery apparatus 7, the absorption column 10 and the regeneration column 20' are the same as in the FIG. 6, and the regeneration column 20' has three regenerating sections 22a, 22b and 22c. However, this embodiment is different in the form of supplying the absorbing liquid into the second regenerating section 22b and the third regenerating section 22c, which are in a branch flow system. In other words, in FIG. 6, paths of supplying the absorbing liquid A1 from the bottom portion of the absorption column 10 into the third regenerating section 22c and the second regenerating section 22b are in series, however, in FIG. 7, the branch flow system further has an additional branch flow system branched therefrom, and supplying-paths into the second regenerating section 22b and the third regenerating section 22c are parallel to each other. Accordingly, in the branch flow system, the absorbing liquid A1 that has flowed through the first absorbing section 12a is branched into two flows, and these flows pass through the second regenerating section 22b and the third regenerating section 22c, respectively, to be joined with each other into the circulation system.

Specifically, in the same manner as in FIG. 6, a tank 24' is placed in which the absorbing liquid regenerated in the third regenerating section 22c is to be stored. Instead of the first heat exchanger 29 in FIG. 1, two heat exchangers 29c and 29d are used. The path L4a through which a bottom region of the absorption column 10 and an upper region of the third regenerating section 22c are connected to each other is branched to provide a path L4b which is connected to an upper region of the second regenerating section 22b. The absorbing liquid A1 on the bottom portion of the absorption column 10 is supplied to be distributed into the second regenerating section 22b and the third regenerating section 22c. A lower region of the third regenerating section 22c is connected through a path L5c into a tank 24'. The tank 24' is connected to a path L2 through a path L6c at which a pump 27' is arranged. A lower region of the second regenerating section 22b is connected through a path L5d to a tank 24. The tank 24 is connected to a path L6c through a path L6d at which a pump 27 is arranged. Therefore, the absorbing liquid A1' supplied from a liquid reservoir of the third regenerating section 22c to the tank 24' is caused to flow through the path L6c and then joined into the path L2 by the pump 27'. The absorbing liquid A1" supplied from a liquid reservoir of the second regenerating section 22b to the tank 24 is caused to flow through the path L6d and then joined into the path L6c by the pump 27. Consequently, the absorbing liquid A1" is supplied together with absorbing liquid A1' into the path L2. The heat exchanger 29c is arranged to perform heat exchange between the paths L4a and L6c, and the heat exchanger 29d is arranged to perform heat exchange between the paths L4b and L6d.

The absorbing liquid A1 passing through the path L4a is heated by heat exchange in the heat exchanger 29c, and then supplied into the third regenerating section 22c. The absorbing liquid A1 emits carbon dioxide by gas-liquid contact in the third regenerating section 22c, and then stored in a liquid reservoir of a partitioning member 23'. The absorbing liquid A1' in the liquid reservoir passes through the paths L5c and L6c to be cooled in the heat exchanger 29c, and is then joined with the absorbing liquid A2' in the path L2. The absorbing liquid A1 passing in the path L4b is heated by heat exchange in the heat exchanger 29d, and is then supplied into the second regenerating section 22b. The absorbing liquid A1 emits carbon dioxide by gas-liquid contact in the second regenerating section 22b, and is then stored in a liquid reservoir of a partitioning member 23. The absorbing liquid A1" in the liquid receiver passes through the paths L5d and L6d to be cooled in the heat exchanger 29d, and is then joined, together with the absorbing liquid A1' in the path L6c, with the absorbing liquid A2' in the path L2. The absorbing liquid obtained by the joint of absorbing liquid A1', A1" and A2' parts with each other in the path L2 is heated in the second heat exchanger 30 by heat exchange with the absorbing liquid A2 in the path L7, and then supplied into the upper region of the first regenerating section 22a.

In the circulating step in which the absorbing liquid is circulated in the circulation system formed by the paths L1, L2 and L7, S represents the flow rate of the absorbing liquid flowing in the path before the point where the absorbing liquid flow is branched and in the path after the point where the branch flow is joined with the main flow, $\Delta$S1 represents the flow rate of the absorbing liquid supplied into the second regenerating section 22b in the branch flow step, and $\Delta$S2 represents the flow rate of the absorbing liquid supplied into the third regenerating section 22c in the additional branch flow step. Under this promise, the ratio of the flow rate $\Delta$S1 to the flow rate S, the ratio of $\Delta$S1/S, and that of the flow rate $\Delta$S2 to the flow rate S, the ratio of $\Delta$S2/S, are appropriately set, considering, in the same manner, the carbon dioxide amount in gas G, the absorbing performance and the regeneration property of the absorbing liquid, and others. From the viewpoint of the quantity of heat recovered in the second regenerating section 22b and the third regenerating section 22c, it is advisable to set the ratio of $\Delta$S1/S generally into the range of about $1/10$ to $8/10$, preferably into that of about $2/10$ to $6/10$. It is advisable to set the ratio of $\Delta$S2/S generally into the range of about $1/10$ to $8/10$, preferably into that of about $2/10$ to $6/10$.

In regard to the recovery apparatus 7 in FIG. 7, others than the above-described matters are the same as those in the recovery apparatus 1 in FIG. 1 and the recovery apparatus 6 in FIG. 6. Thus, description thereof is omitted. In the recovery apparatus 7 in FIG. 7 also, a modification as made in the recovery apparatus 2 in FIG. 2 may be made. Specifically, a branch path and a heat exchanger may be configured in such a manner that the absorbing liquid (A1'+A1"+A2') to be supplied through the path L2 into the first regenerating section 22a is divided into the main and a part, before supplied into the second heat exchanger 30, and that part of the absorbing liquid is heated by heat discharged from a steam heater 25, and it is subsequently joined into the path L2 at the downstream side of the second heat exchanger 30. In this way, it is possible to reduce the size of the second heat exchanger 30. Alternatively, it is allowable to set a heat exchanger to heat the absorbing liquid (A1' and A1") passing through the paths L6c and L6d before these paths are jointed or through the path L6c after the path L6d is jointed thereto, by heat discharged from the steam heater 25, and shift the joint point between the paths L6c and L6d and the path L2 to a downstream position of the second heat exchanger 30. Alternatively, it is allowable, as same in the recovery apparatus 4 illustrated in FIG. 4, to provide a branch path which is branched from the path L7 in which the absorbing liquid A2 is caused to flow back from the first regenerating section 22a into the second absorbing section 12b, and change the heat exchange form to such a form that heat exchange is made with the path L6d, the path L6c, the path L4b and the path L4a successively, so as to cause absorbing liquid as the absorbing liquid A1' and the absorbing liquid A1" in the paths L6c and L6d to be joined into the path L2 without being subjected to any heat exchange with the paths L4a and L4b. Furthermore, the present embodiment may be carried out with use of the modification in FIG. 2 and the modification in FIG. 4 in combination. Specifically, instead of the heat exchangers 29c and 29d, four heat exchangers for attaining heating by means of heat discharged from the steam heater 25 are arranged. Then heat exchange is performed successively, in order from the upstream-side (high-temperature-side) heat exchanger to the downstream-side one, with the absorbing liquid A1" in the path L6d, the absorbing liquid A1 in the path L4b, the absorbing liquid A1' in the path L6c, and the absorbing liquid A1 in the path L4a, respectively, and connection is made in such a manner that the absorbing liquid A1' in the path L6c and the absorbing liquid A1" in the path L6d, after passing the heat exchangers, are joined into the path L2 at the downstream side of the second heat exchanger 30. In this manner, the absorbing liquid A" in the tank 24 and the absorbing liquid A1' in the tank 24' are heated as they are, without being subjected to any heat exchange, and they are supplied to the first regenerating section 22a and the second regenerating section 22b, respectively. Thus the thermal energy to be consumed in the branch flow system is supplied, using the waste heat.

In the recovery apparatus 7 in FIG. 7, the temperature T5 of the absorbing liquid A1' in the third regenerating section 22c is lower than the temperature T3 of the absorbing liquid A" in the second regenerating section 22b, and the absorbing liquid A1' also becomes lower in regeneration degree. As a result, in the recovery apparatus 7 in FIG. 7, the regeneration degrees of the absorbing liquid (A1'+A1") flowing jointly in the path L2 is averaged between two flows, so that the regeneration degree is made lower than that of the absorbing liquid A1" in the recovery apparatus 6 in FIG. 6. As an embodiment for improving this matter given is an embodiment of dividing the absorption column 10 also into three absorbing sections to dispose the third absorbing section above the first and second absorbing sections, and forming one circulation system and two branch flow systems. Specifically, this embodiment has a circulation system for circulating the absorbing liquid between the third absorbing section and the first regenerating section; and two branch flow systems branched from this circulation system and joined therewith, in which the paths are connected in such a manner that one of the branch flow systems causes the absorbing liquid to flow from the third absorbing section through the second absorbing section and the second regenerating section to reach the second regenerating section, and the other branch flow system causes the absorbing liquid to flow from the third absorbing section through the first absorbing section and the third regenerating section to reach the first regenerating section. A gas G containing carbon dioxide passes from the first absorbing section through the second absorbing section to reach the third absorbing section from which the gas is discharged to the outside. A carbon-dioxide-containing gas, discharged in the first regenerating section by heat supplied from the outside, passes through the second regenerating section to reach the third regenerating section from which the gas is discharged to the outside.

Alternatively, the paths may be connected in such a manner that: in one of the two branch flow systems which are branched from and then joined to the circulation system in which the absorbing liquid is circulated between the third absorbing section and the first regenerating section, the absorbing liquid passes from the third absorbing section through the second absorbing section and the second regenerating section to reach the first regenerating section; and the other branch flow system is branched further from the former branch flow system and then joined therewith to cause the absorbing liquid to pass from the second absorbing section through the first absorbing section and the third regenerating section to reach the second regenerating section.

In the similar manner, the inside of the absorption column and that of the regeneration column may be divided into four or more absorbing sections, and four or more regenerating sections, respectively, to circulate a plural kinds of absorbing liquids.

INDUSTRIAL APPLICABILITY

The present invention is usable for a treatment or some other operation of carbon-dioxide-containing gas discharged from thermal power plants, ironworks, boilers and other facilities, and is useful for reducing the amount of discharged carbon dioxide from them, the effect thereof onto the environment, and others. The invention possibly provides a carbon dioxide recovery apparatus capable of reducing costs required for carbon dioxide collecting process, and contributing to energy saving and environmental protection.

As there are many apparently widely different embodiments of the present invention that may be made without departing from the spirit and scope thereof, it is to be understood that the invention is not limited to the specific embodiments thereof, except as defined in the appended claims.

What is claimed is:

1. A carbon dioxide recovery apparatus, comprising:
an absorption column configured to bring a gas into contact with an absorbing liquid and to allow the absorbing liquid to absorb carbon dioxide contained in the gas, the absorption column having a first absorbing section and a second absorbing section which are arranged to supply the gas from the first absorbing section to the second absorbing section;
a regeneration column that regenerates the absorbing liquid, configured to heat the absorbing liquid having carbon dioxide absorbed in the absorption column to cause the absorbing liquid to release the carbon dioxide, the regeneration column having a first regenerating section having an external heating implement and a second regenerating section arranged to be heated by heat from gas discharged from the first regenerating section; and
a circulating mechanism comprising a circulation system configured to circulate the absorbing liquid between the second absorbing section and the first regenerating section, and a branch flow system branched from the circulation system to cause a part of the absorbing liquid circulated in the circulation system to flow from the second absorbing section through the first absorbing section and the second regenerating section successively, and be directed to the first regenerating section, wherein the branch flow system has a first path branched from the circulation system to supply the absorbing liquid from the second absorbing section to the first absorbing section, a second path for supplying the absorbing liquid from the first absorbing section to the second regenerating section, and a third path extended from the second regenerating section to be joined with the circulation system, and the circulation system has a first path and a second path which are branched from each other and cause the absorbing liquid of the first regenerating section to return to the second absorbing section, the first path of the branch flow system has a cooler for cooling the absorbing liquid to be supplied into the first absorbing section, the circulating mechanism has a first heat exchanger, a second heat exchanger, and a third heat exchanger, wherein the first heat exchanger makes heat exchange between the first path of the circulation system and the third path of the branch flow system, wherein the second heat exchanger makes heat exchange between the absorbing liquid to be supplied from the second absorbing section to the first regenerating section in the circulation system, and the absorbing liquid in the second path of the circulation system, and wherein the third heat exchanger makes heat exchange, at the downstream side of the first heat exchanger in the first path of the circulation system, between the first path of the circulation system and the second path of the branch flow system.

2. The carbon dioxide recovery apparatus according to claim 1, wherein the second regenerating section has no external heating implement.

3. The carbon dioxide recovery apparatus according to claim 1, wherein a temperature at which the absorbing liquid flowing in the branch flow system is supplied to the second regenerating section is lower than a temperature at which the absorbing liquid circulated in the circulation system is supplied to the first regenerating section.

4. The carbon dioxide recovery apparatus according to claim 1, wherein the circulation system further has a path and a heat exchanger for heating a part of the absorbing liquid to be supplied from the second absorbing section to the first regenerating section, using afterheat in the external heating implement of the regeneration column.

5. The carbon dioxide recovery apparatus according to claim 1, wherein the absorption column has two columns independent from each other into which the first absorbing section and the second absorbing section are distributed, respectively, and the regeneration column has two columns independent from each other into which the first regenerating section and the second regenerating section are distributed, respectively.

6. The carbon dioxide recovery apparatus according to claim 1, wherein the regeneration column further has a third regenerating section which is heated by heat from gas discharged from the second regenerating section, and the branch flow system of the circulating mechanism is configured to cause the absorbing liquid to pass from the first absorbing section to the second regenerating section through the third regenerating section.

7. The carbon dioxide recovery apparatus according to claim 1, wherein the regeneration column further has a third regenerating section which is heated by heat from gas discharged from the second regenerating section, and the branch flow system of the circulating mechanism has an additional path which is branched from the branch flow system to cause a part of the absorbing liquid circulating in the circulating system to pass from the second absorbing section through the first absorbing section and the third regenerating section successively and to be directed then to the first regenerating section.

8. The carbon dioxide recovery apparatus according to claim 1, wherein the circulation system and the branch flow system are connected to each other in such a manner that the absorbing liquid which is supplied from the second absorbing section to the first regenerating section in the circulation system is joined with the absorbing liquid in the third path of the branch flow system at the downstream side of the second heat exchanger.

9. The carbon dioxide recovery apparatus according to claim 8, wherein the circulation system has a tank in which the absorbing liquid to be supplied from the second absorbing section into the first regenerating section is stored at the upstream side of the second heat exchanger.

* * * * *